United States Patent
Sakura et al.

(10) Patent No.: US 10,265,769 B2
(45) Date of Patent: Apr. 23, 2019

(54) APPARATUS FOR FABRICATING THREE-DIMENSIONAL OBJECT

(71) Applicant: RICOH COMPANY, LTD., Tokyo (JP)

(72) Inventors: Shozo Sakura, Kanagawa (JP); Shinichiroh Satoh, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 212 days.

(21) Appl. No.: 15/299,788

(22) Filed: Oct. 21, 2016

(65) Prior Publication Data

US 2017/0120521 A1 May 4, 2017

(30) Foreign Application Priority Data

Nov. 4, 2015 (JP) .................................. 2015-217143

(51) Int. Cl.
*B29C 64/165* (2017.01)
*B29C 64/188* (2017.01)
(Continued)

(52) U.S. Cl.
CPC ............ *B22F 3/008* (2013.01); *B22F 3/1055* (2013.01); *B29C 64/165* (2017.08);
(Continued)

(58) Field of Classification Search
CPC ...... B22F 2003/1056; B22F 2003/1057; B22F 2003/1059; B29C 64/153; B29C 64/165;
(Continued)

(56) References Cited

U.S. PATENT DOCUMENTS 5,252,264 A * 10/1993 Forderhase ............. B22F 3/004
156/272.8
5,387,380 A * 2/1995 Cima ...................... B05C 19/04
264/109
(Continued)

FOREIGN PATENT DOCUMENTS

EP 1775103 A2 4/2007
EP 2 286 982 A1 2/2011
(Continued)

OTHER PUBLICATIONS

European search report dated Apr. 6, 2017 in connection with corresponding European patent application No. 16195144.7.
(Continued)

*Primary Examiner* — Michael A Tolin
(74) *Attorney, Agent, or Firm* — Cooper & Dunham LLP

(57) ABSTRACT

A three-dimensional fabricating apparatus includes a fabrication chamber, a supply chamber, a flattening unit, and a controller. In the fabrication chamber, powder is layered to form a powder layer and bonded together in a desired shape to form a layered fabrication object. The supply chamber stores the powder. The flattening unit is reciprocally movable above the supply chamber and the fabrication chamber, to transfer the powder and flatten the powder in the fabrication chamber to form the powder layer. The controller is configured to control the flattening unit to move in a first direction to transfer and supply the powder from the supply chamber to the fabrication chamber. The controller is configured to control the flattening unit to move in a second direction opposite the first direction to form the powder layer and transfer an unused portion of the powder from the fabrication chamber to the supply chamber.

8 Claims, 21 Drawing Sheets

(51) Int. Cl.
*B29C 64/218* (2017.01)
*B29C 64/255* (2017.01)
*B29C 64/386* (2017.01)
*B33Y 30/00* (2015.01)
*B33Y 50/02* (2015.01)
*B22F 3/00* (2006.01)
*B22F 3/105* (2006.01)
*B29C 64/20* (2017.01)
*G05B 19/409* (2006.01)

(52) U.S. Cl.
CPC .......... *B29C 64/188* (2017.08); *B29C 64/20* (2017.08); *B29C 64/218* (2017.08); *B29C 64/255* (2017.08); *B33Y 30/00* (2014.12); *B22F 2003/1056* (2013.01); *B22F 2003/1059* (2013.01); *B29C 64/386* (2017.08); *B33Y 50/02* (2014.12); *G05B 19/409* (2013.01); *G05B 2219/49018* (2013.01); *G05B 2219/49023* (2013.01); *G05B 2219/49078* (2013.01); *G05B 2219/49106* (2013.01); *Y02P 10/295* (2015.11)

(58) Field of Classification Search
CPC ... B29C 64/188; B29C 64/205; B29C 64/214; B29C 64/218; B29C 64/245; B29C 64/255; B29C 64/259; B29C 64/321; B29C 64/357; B29C 64/386; B29C 64/393; B33Y 10/00; B33Y 30/00; B33Y 40/00; B33Y 50/02; G05B 19/4099; G05B 2219/49023; G05B 2219/49078
See application file for complete search history.

(56) References Cited

U.S. PATENT DOCUMENTS

| | | | |
|---|---|---|---|
| 8,845,050 | B2 * | 9/2014 | Matsui .................. B41J 25/308 347/107 |
| 2007/0087071 | A1 | 4/2007 | Devos et al. |
| 2012/0107438 | A1 | 5/2012 | Bokodi et al. |
| 2014/0265034 | A1 | 9/2014 | Dudley |
| 2015/0071809 | A1 | 3/2015 | Nordkvist et al. |
| 2015/0343533 | A1 | 12/2015 | Park et al. |
| 2016/0074938 | A1 | 3/2016 | Kitani et al. |
| 2016/0075084 | A1 | 3/2016 | Sakura |
| 2016/0236422 | A1 | 8/2016 | Sakura |
| 2016/0243805 | A1 | 8/2016 | Satoh |
| 2016/0332371 | A1 | 11/2016 | Staroselsky et al. |

FOREIGN PATENT DOCUMENTS

| | | |
|---|---|---|
| JP | 2000-336403 | 12/2000 |
| JP | 2005-059324 | 3/2005 |
| JP | 2007-307742 | 11/2007 |
| JP | 2015-227021 | 12/2015 |
| JP | 2016-137598 | 8/2016 |
| WO | WO93/08928 | 5/1993 |
| WO | WO2011/001270 A2 | 1/2011 |
| WO | WO2014/188778 A1 | 11/2014 |
| WO | WO2015/112422 A1 | 7/2015 |

OTHER PUBLICATIONS

European Office Action issued in European Patent Application No. 16195144.7 dated Feb. 22, 2019.

* cited by examiner

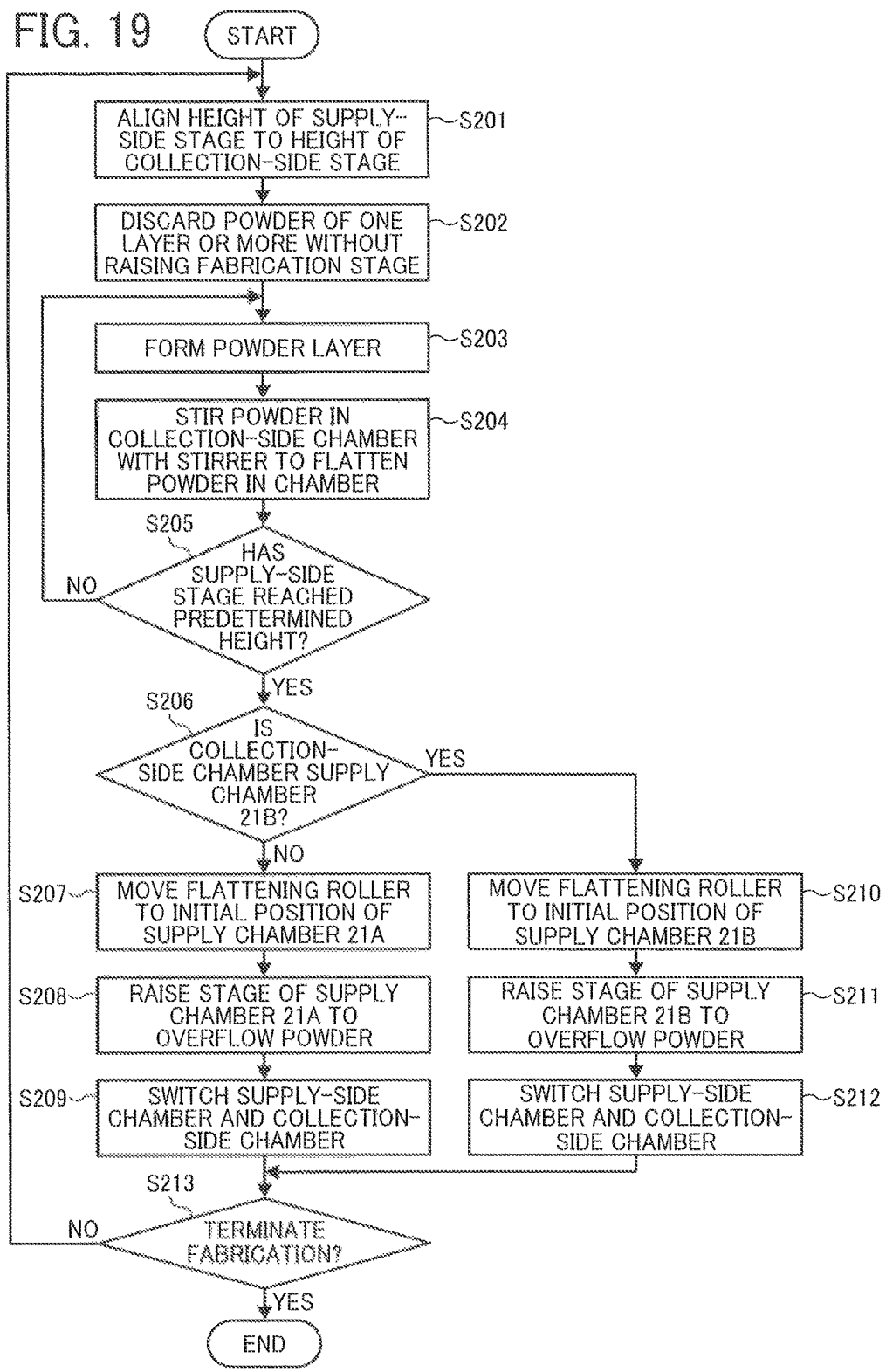

US 10,265,769 B2

APPARATUS FOR FABRICATING THREE-DIMENSIONAL OBJECT

CROSS-REFERENCE TO RELATED APPLICATION

This patent application is based on and claims priority pursuant to 35 U.S.C. § 119(a) to Japanese Patent Application No. 2015-217143 filed on Nov. 4, 2015 in the Japan Patent Office, the entire disclosure of which is hereby incorporated by reference herein.

BACKGROUND

Technical Field

Aspects of the present disclosure relate to an apparatus for fabricating a three-dimensional object.

Related Art

A solid (three-dimensional) fabricating apparatus uses, for example, a lamination fabrication method to fabricate a solid (three-dimensional) object. In such a lamination fabrication method, for example, a flattened metal or non-metal powder is formed in a shape of layer on a fabrication stage, and fabrication liquid for bonding powder is discharged from a head to a layered powder (referred to as "powder layer") on the fabrication stage to form a layered fabrication object (referred to as "fabrication layer") in which powder particles are bonded together. An operation of forming another powder layer on the fabrication layer to form another fabrication layer is repeated to laminate the fabrication layers one on another, thus fabricating a three-dimensional object.

SUMMARY

In an aspect of the present disclosure, there is provided a three-dimensional fabricating apparatus that includes a fabrication chamber, a supply chamber, a flattening unit, and a controller. In the fabrication chamber, powder is layered to form a powder layer and bonded together in a desired shape to form a layered fabrication object. The supply chamber stores the powder. The flattening unit is reciprocally movable above the supply chamber and the fabrication chamber, to transfer the powder and flatten the powder in the fabrication chamber to form the powder layer. The controller is configured to control the flattening unit to transfer the powder and form the powder layer. The controller is configured to control the flattening unit to move in a first direction to transfer and supply the powder from the supply chamber to the fabrication chamber. The controller is configured to control the flattening unit to move in a second direction opposite the first direction to form the powder layer and transfer an unused portion of the powder from the fabrication chamber to the supply chamber.

In another aspect of the present disclosure, there is provided a three-dimensional fabricating apparatus that includes a fabrication chamber, two supply chambers, a flattening unit, and a stirrer. In the fabrication chamber, powder is layered to form a powder layer and bonded together in a desired shape to form a layered fabrication object. The two supply chambers are disposed at both sides of the fabrication chamber, to store the powder. The flattening unit is reciprocally movable above the two supply chambers and the fabrication chamber, to transfer the powder from the two supply chambers to the fabrication chamber and flatten the powder in the fabrication chamber to form the powder layer. The flattening unit supplies the powder from one supply chamber of the two supply chambers to the fabrication chamber and transfers an unused portion of the powder into another supply chamber of the two supply chambers. The stirrer is disposed in each of the two supply chambers, to stir the unused portion of the powder.

BRIEF DESCRIPTION OF THE SEVERAL VIEWS OF THE DRAWINGS

The aforementioned and other aspects, features, and advantages of the present disclosure would be better understood by reference to the following detailed description when considered in connection with the accompanying drawings, wherein:

FIG. 19 is a flowchart of the control of the operation of forming the powder layer, performed by the controller in the fifth embodiment;

Figure 1:
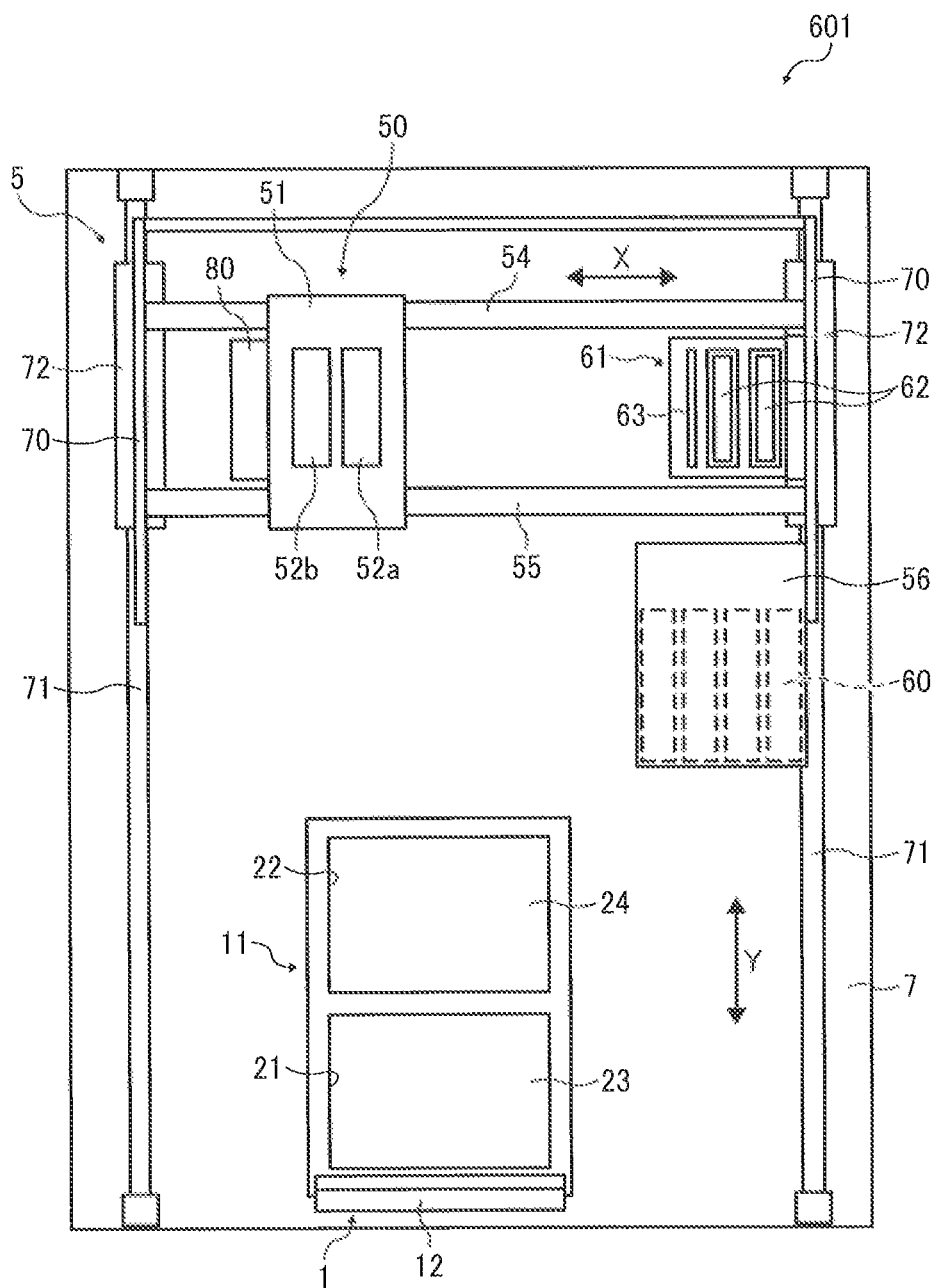
FIG. 1 is a plan view of an example of a three-dimensional fabricating apparatus according to a first embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Figure 2:
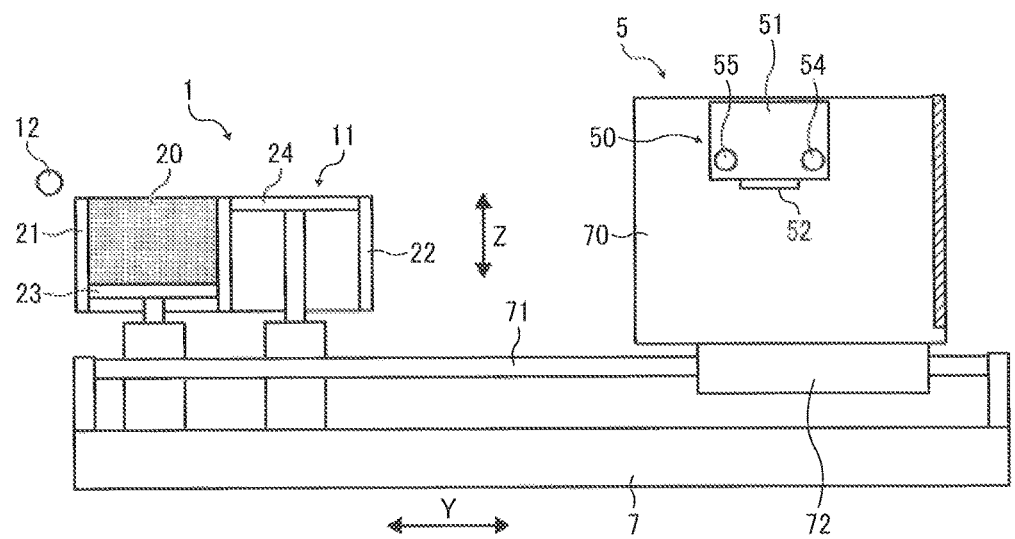
FIG. 2 is a side view of the three-dimensional fabricating apparatus of FIG. 1.
Figure 3:
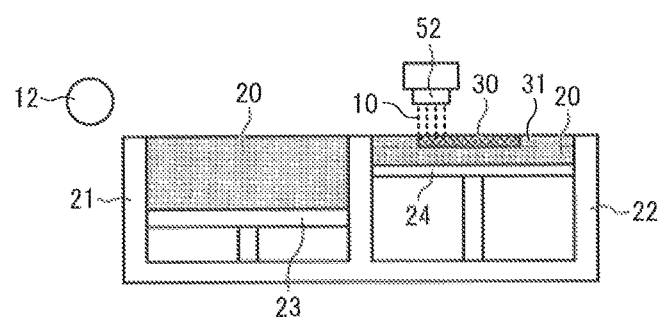
FIG. 3 is a cross-sectional view of a fabrication section of the three-dimensional fabricating apparatus of FIG. 1.
Figure 4:
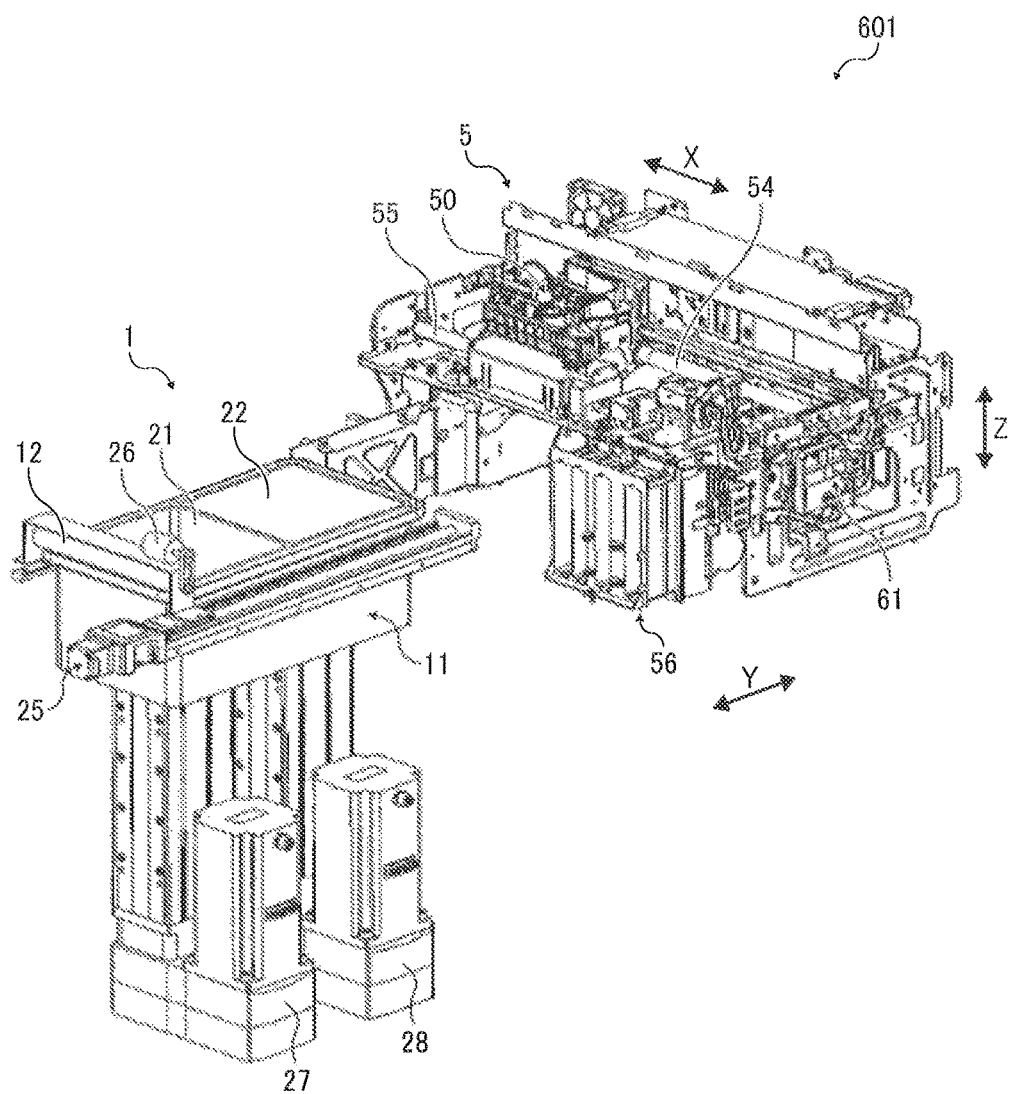
FIG. 4 is a partial perspective view of an example of a configuration of the three dimensional fabricating apparatus according to the first embodiment.

Referring now to the drawings, wherein like reference numerals designate identical or corresponding parts throughout the several views, embodiments of the present disclosure are described below. First, an example of a three-dimensional fabricating apparatus according to a first embodiment of this disclosure is described with reference to FIGS. 1 through 4. FIG. 1 is a plan view of the three-dimensional fabricating apparatus according to the first embodiment of this disclosure. FIG. 2 is a cross-sectional view of a fabrication section of the three-dimensional fabricating apparatus of FIG. 1. FIG. 3 is a cross-sectional view of the fabrication section of FIG. 2. In FIG. 3, a state of the fabricating section during fabrication is illustrated. FIG. 4 is a partial perspective view of the three-dimensional fabricating apparatus according to the fourth embodiment of the present disclosure.

In this embodiment, a three-dimensional fabricating apparatus 601 is a powder fabricating apparatus (also referred to as a powder fabricating apparatus). The three dimensional fabricating apparatus 601 includes a fabrication section 1 and a fabrication unit 5. The fabrication section 1 forms a fabrication layer 30 that is a layered fabrication object in which powders are bonded together. The fabrication unit 5 fabricates a three-dimensional object by discharging fabrication liquid 10 onto a powder layer 31 that is overlaid in layers in the fabrication section 1.

The fabrication section 1 includes a powder chamber 11 and a flattening roller 12 as a rotary member that is a flattening unit (recoater). Note that the flattening unit may be, for example, a plate member (blade) instead of the rotary member.

The powder chamber 11 includes a supply chamber 21 to retain supply powder 20 to be supplied to the fabrication chamber 22 and a fabrication chamber 22 in which fabrication layers 30 are laminated to fabricate an object.

A bottom portion of the supply chamber 21 acts as a supply stage 23 and is movable upward and downward in a vertical direction (height direction). Similarly, a bottom portion of the fabrication chamber 22 acts as a fabrication stage 24 and is movable upward and downward in the vertical direction (height direction). A three-dimensional object in which the fabrication layers 30 are laminated is fabricated on the fabrication stage 24.

For example, as illustrated in FIG. 4, a motor 27 moves the supply stage 23 upward and downward along a direction (height direction) indicated by arrow Z. Likewise, a motor 28 moves the fabrication stage 24 upward and downward along the direction indicated by arrow Z.

The flattening roller 12 transfers and supplies the powder 20, which is supplied on the supply stage 23 of the supply chamber 21, to the fabrication chamber 22. The flattening roller 12 evens and flattens the surface of the powder 20 supplied to the fabrication chamber 22, to form the powder layer 31.

The flattening roller 12 is disposed to be relatively reciprocally movable with respect to a stage surface (a surface on which powder 20 is stacked) of the fabrication stage 24 along a direction indicated by arrow Y in FIG. 2, which is a direction along the stage surface of the fabrication stage 24. The flattening roller 12 is moved by a reciprocal moving assembly 25. The flattening roller 12 is driven to rotate by a motor 26.

The fabrication unit 5 includes a liquid discharge unit 50 to discharge (provide) fabrication liquid 10 to bond the powder 20 to the powder layer 31 on the fabrication stage 24, to form the fabrication layer 30 as a layered fabrication object in which the powder 20 is bonded together.

The liquid discharge unit 50 includes a carriage 51 and two liquid discharge heads (hereinafter referred to as simply "head(s)") 52a and 52b mounted on the carriage 51. In FIG. 1, two liquid discharge heads are illustrated. However, in some embodiments, the number of liquid discharge heads is one, or three or more.

The carriage 51 is movably held with guides 54 and 55. The guides 54 and 55 are held with lateral side plates 70 so as to be movable upward and downward.

Via a pulley and a belt, an X-direction scanning motor constituting an X-direction scanning assembly 550 reciprocally moves the carriage 51 along the direction indicated by arrow X that is a main scanning direction. Note that, hereinafter, the direction indicated by arrow X is simply referred to as "X direction", and the same applies to "Y direction" and "Z direction".

Each of the two heads 52a and 52b (hereinafter, referred to as "heads 52" unless distinguished) includes two nozzle rows, each including a plurality of nozzles arrayed to discharge fabrication liquid. Two nozzle rows of one head 52a discharge, for example, cyan fabrication liquid and magenta fabrication liquid. Two nozzle rows of the other head 52a discharge, for example, yellow fabrication liquid and black fabrication liquid. Note that the configuration of head is not limited to the above-described configuration of the heads 52 and may be any other suitable configuration.

A tank mount 56 mounts a plurality of tanks 60 containing cyan fabrication liquid, magenta fabrication liquid, yellow fabrication liquid, and black fabrication liquid. The fabrication liquids are supplied to the heads 52a and 52b through, e.g., supply tubes.

Further, a maintenance assembly 61 to maintain and recover the heads 52 of the liquid discharge unit 50 in good condition is disposed at one end in the X direction.

The maintenance assembly 61 includes caps 62 and a wiper 63. The caps 62 are brought into close contact with nozzle faces (nozzle formed faces) of the heads 52, and fabrication liquid is sucked from nozzles. Thus, powder clogged at the nozzles and thickened fabrication liquid are discharged. Then, the wiper 63 wipes the nozzle faces to form menisci in the nozzles (with the interiors of the nozzles being in negative pressure state). When fabrication liquid is not discharged, the maintenance assembly 61 covers the nozzle faces of the heads 52 with the caps 62 to prevent incorporation of powder 20 into nozzles and drying of the fabrication liquid 10.

The fabrication unit 5 includes a slider portion 72 slidably supported on a guide 71 above a base 7. The entire fabrication unit 5 is reciprocally movable in the Y direction perpendicular to the X direction. The entire fabrication unit 5 is reciprocally moved along the Y direction by the Y-direction scanning assembly 552.

The liquid discharge unit 50 is disposed to be movable upward and downward along the Z direction together with the guides 54 and 55. A Z-direction elevation assembly 551 moves the liquid discharge unit 50 upward and downward along the Z direction.

In the following, the fabrication section 1 is further described.

The powder chamber 11 has a box shape and includes two chambers, the supply chamber 21 and the fabrication chamber 22, each of which is open at the upper side thereof. The supply stage 23 and the fabrication stage 24 are arranged inside the supply chamber 21 and the fabrication chamber 22, respectively, so as to be movable upward and downward.

Lateral faces of the supply stage 23 are disposed to contact inner lateral faces of the supply chamber 21. Lateral faces of the fabrication stage 24 are disposed to contact inner lateral faces of the fabrication chamber 22. The upper faces of the supply stage 23 and the fabrication stage 24 are held horizontally.

The powder supplier 554 is disposed above the supply chamber 21. In an initializing operation of fabrication or when the amount of powder in the supply chamber 21 decreases, powder in a tank constituting the powder supplier 554 is supplied to the supply chamber 21. Examples of a powder transporting method for supplying powder include a screw conveyor method utilizing a screw and an air transport method utilizing air.

The flattening roller 12 transfers and supplies powder 20 from the supply chamber 21 to the fabrication chamber 22 and smooths and flattens the surface of the powder 20 to form a powder layer 31 as a layered powder having a desired thickness.

The flattening roller 12 is a bar longer than an inside dimension of the fabrication chamber 22 and the supply chamber 21 (that is, a width of a portion to which powder is supplied or stored). The reciprocal moving assembly 25 reciprocally moves the flattening roller 12 in the Y direction (a sub-scanning direction) along the stage surface on the supply chamber 21 and the fabrication chamber 22.

The flattening roller 12, while being rotated by the motor 26, horizontally moves forward and backward to pass an area above the supply chamber 21 and the fabrication chamber 22. Accordingly, the powder 20 is transferred and supplied onto the fabrication chamber 22, and the flattening roller 12 flattens the powder 20 while passing over the fabrication chamber 22, thus forming the powder layer 31.

Figure 5:
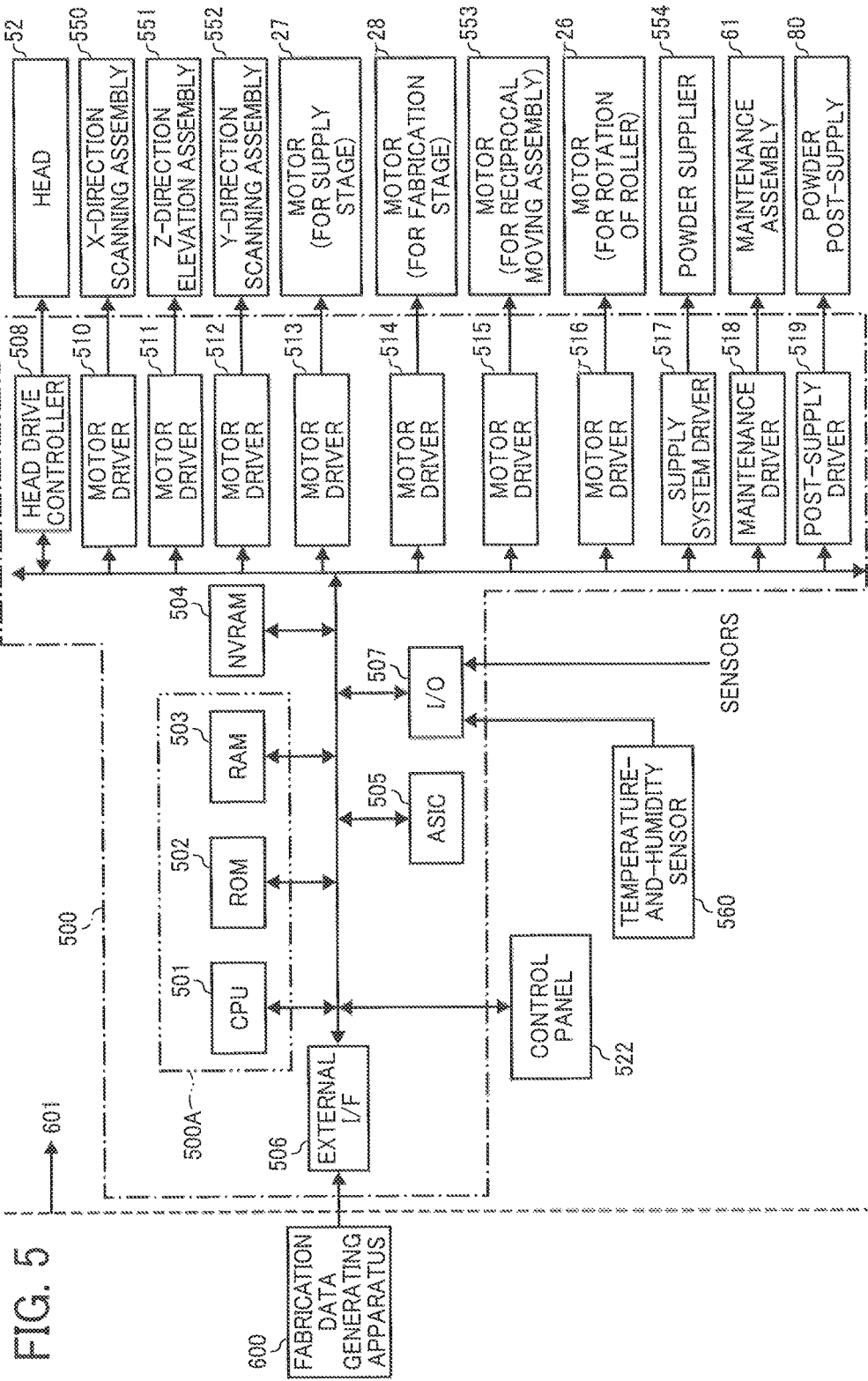
FIG. 5 is a block diagram of an outline of a controller of the three-dimensional fabricating apparatus in the first embodiment.

Next, an outline of a controller of the three-dimensional fabricating apparatus in this embodiment is described with reference to FIG. 5. FIG. 5 is a block diagram of a controller of the three-dimensional fabricating apparatus 601 according to an embodiment of the present disclosure.

A controller 500 as the controller includes a main controller 500A. The main controller 500A includes a central processing unit (CPU) 501, a read-only memory (ROM) 502, a random access memory (RAM) 503, a non-volatile random access memory (NVRAM) 504, and an application-specific integrated circuit (ASIC) 505. The CPU 501 manages the control of the entire three-dimensional fabricating apparatus 601. The ROM 502 stores programs executed by the CPU 501 and other fixed data. The programs stored in the ROM 502 include programs for causing the CPU 501 to execute control of three-dimensional fabricating operation which includes control according to embodiments of the present disclosure. The RAM 503 temporarily stores fabrication data and other data.

The NVRAM 504 retains data even when the apparatus is powered off. The ASIC 505 performs image processing, such as processing of various signals on image data, and processes input and output signals to control the entire apparatus.

The controller 500 also includes an interface (I/F) 506 to send and receive data and signals used in receiving fabrication data from an external fabrication data generating apparatus 600. The fabrication data generating apparatus 600 generates fabrication data in which a final-form object is sliced in multiple fabrication layers, and is constituted of an information processing apparatus, such as a personal computer.

The controller 500 includes an input-output (I/O) unit to receive detection signals of various sensors.

The controller 500 includes a head drive controller 508 to control driving of the heads 52 of the liquid discharge unit 50.

The controller 500 includes a motor driver 510 and a motor driver 512. The motor driver 510 drives a motor constituting the X-direction scanning assembly 550 to move the carriage 51 of the liquid discharge unit 50 in the X direction (the main scanning direction). The motor driver 512 drives a motor constituting the Y-direction scanning assembly 552 to move the fabrication unit 5 in the V direction (the sub-scanning direction).

The controller 500 includes a motor driver 511 to drive a motor constituting the Z-direction elevation elevation assembly 551 to move (elevate) the carriage 51 of the liquid discharge unit 50 upward and downward in the Z direction. Note that the fabrication unit 5 may be elevated in the direction indicated by arrow Z.

The controller 500 includes a motor driver 513 and a motor driver 514. The motor driver 513 drives the motor 27 to elevate the supply stage 23 upward and downward. The motor driver 514 drives the motor 28 to elevate the fabrication stage 24 upward and downward.

The controller 500 includes a motor driver 515 and a motor driver 516. The motor driver 515 drives a motor 553 of the reciprocal moving assembly 25 to move the flattening roller 12. The motor driver 516 includes the motor 26 to rotate the flattening roller 12.

The controller 500 includes a supply system driver 517 and a maintenance driver 518. The supply system driver 517 drives the powder supplier 554 to supply powder 20 to the supply chamber 21. The maintenance driver 518 drives the maintenance assembly 61 of the liquid discharge unit 50.

The controller 500 includes a post-supply driver 519 to cause a powder post-supply 80 to supply the powder 20.

The I/O unit 507 receives detection signals from, e.g., a temperature-and-humidity sensor 560 to detect temperature and humidity as environmental conditions of the apparatus and detection signals from other sensors.

The controller 500 is connected to a control panel 522 for inputting and displaying information necessary to the three-dimensional fabricating apparatus 601.

Note that the fabrication data generating apparatus 600 and the three-dimensional fabricating apparatus (powder lamination fabricating apparatus) 601 constitutes a fabrication system according to an embodiment of the present disclosure.

Next, control of the operation of forming the powder layer performed by the controller in the first embodiment of the present disclosure is described with reference to FIGS. 6A to 6F. FIGS. 6A to 6F are illustrations of the operation of forming the powder layer in the fabrication section under the control of the controller in the first embodiment.

Figure 6A:
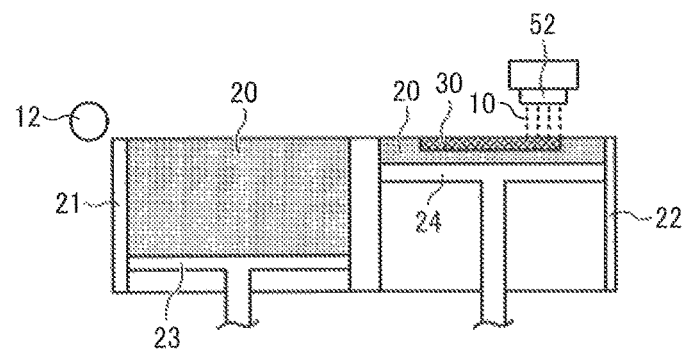
FIGS. 6A to 6F are illustrations of the operation of forming a powder layer in the fabrication section under control of the controller in the first embodiment.

As illustrated in FIG. 6A, for example, one or more fabrication layers 30 are formed on the fabrication stage 24 of the fabrication chamber 22.

Figure 6B:
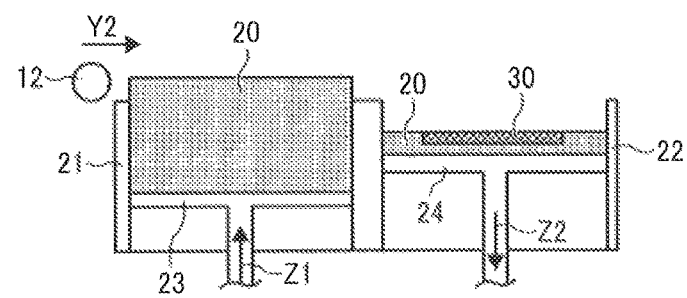

When another fabrication layer 30 is formed on the uppermost fabrication layer 30, as illustrated in FIG. 6B, the supply stage 23 of the supply chamber 21 moves upward by a movement amount z1 in a direction (hereinafter, Z1 direction) indicated by arrow Z1, and the fabrication stage 24 of the fabrication chamber 22 moves downward by a movement amount z2 in a direction (hereinafter, Z2 direction) indicated by arrow Z2.

Each of the movement amount z1 and the movement amount z2 is greater than the thickness $\Delta t$ of the powder layer 31, and the movement amount z2 is equal to or greater than the movement amount z1 ($z2 \geq z1$). When the powder 20 is supplied from the supply chamber 21 to the fabrication chamber 22, such a configuration allows the fabrication chamber 22 to accommodate all the powder 20 supplied to the fabrication chamber 22

Figure 6C:
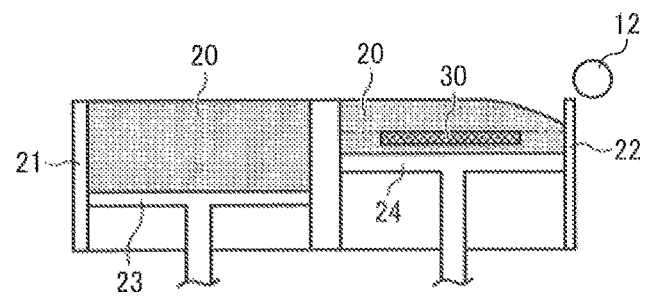

As illustrated in FIG. 6C, by moving the flattening roller 12 in a direction (also referred to forward direction) indicated by arrow Y2 from the supply chamber 21 to transfer and supply the powder 20 to the fabrication chamber 22 (powder supply).

Figure 6D:
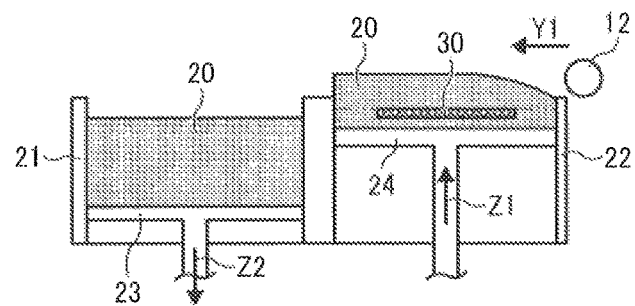

Next, as illustrated in FIG. 6D, the supply stage 23 of the supply chamber 21 moves downward by a movement amount z3 in the Z2 direction, and the fabrication stage 24 of the fabrication chamber 22 moves upward by a movement amount z4 in the Z1 direction. Accordingly, the powder 20 on the fabrication stage 24 of the fabrication chamber 22 is uplifted from an opening of the fabrication chamber 22.

The movement amount z4 of the fabrication stage 24 is set so that a distance between the surface (powder surface) of the preceding powder layer 31 in the fabrication chamber 22 and a lower portion (lower tangenital portion) of the flattening roller 12 equals to the thickness $\Delta t$ of the powder layer 31. The thickness $\Delta t1$ (lamination pitch) of the powder layer 31 is preferably about several tens μm to about 300 μm.

Figure 6E:
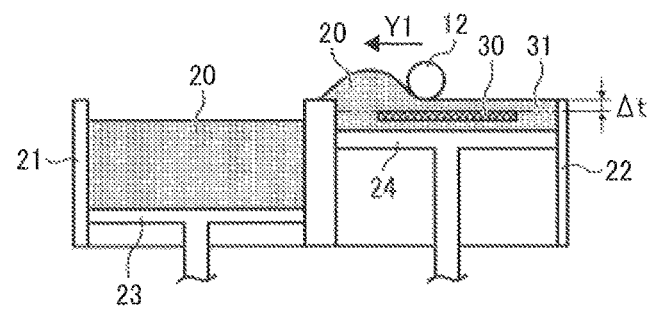

Thus, as illustrated in FIG. 6E, by moving the flattening roller 12 in a direction (also referred to as backward direction) indicated by arrow Y1, the powder layer 31 having a predetermined thickness $\Delta t1$ is formed on the preceding fabrication layer 30 of the fabrication stage 24. A surplus of the powder 20, which has not been used for the formation of the powder layer 31, is returned into the supply chamber 21.

Figure 6F:
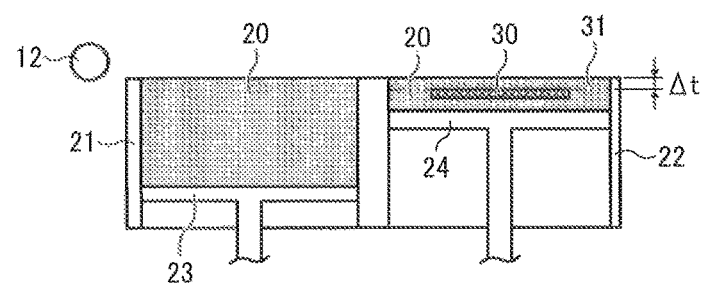

After the powder layer 31 is formed, as illustrated in FIG. 6F, the flattening roller 12 is moved in the direction (hereinafter, Y1 direction) indicated by arrow Y1 and returned to an initial position (original position). Then, the process goes to an operation (fabricating operation) of discharging droplets of fabrication liquid 10 from the heads 52 to form and laminate a desired shape of the next fabrication layer 30 on the powder layer 31.

For the fabrication layer 30, for example, when the fabrication liquid 10 discharged from the heads 52 is mixed with the powder 20, adhesives contained in the powder 20 dissolve and bond together. Thus, particles of the powder 20 bind together to form the fabrication layer 30.

Next, the flattening roller 12 moves in the Y2 direction to transfer and supply the powder 20 to the fabrication chamber 22, and moves the flattening roller 12 in the Y1 direction to flatten the powder 20 to form another powder layer 31. The heads 52 discharge the fabrication liquid 10 to form another fabrication layer 30. At this time, the newly-formed fabrication layer 30 and the preceding fabrication layer 30 are united to form part of a three-dimensional fabrication object.

Then, the step of forming the powder layer 31 by the powder supply and flattening and the step of discharging the fabrication liquid with the heads 52 are repeated a required number of times to finish the three-dimensional fabrication object (solid fabrication object).

As described above, powder is supplied from the supply chamber to the fabrication chamber by the forward movement (movement in a first direction) of the flattening unit, and the formation of the powder layer and collection of unused powder into the supply chamber are performed by the backward movement (movement in a second direction opposite the first direction) of the flattening unit.

For such a configuration, unused powder, which has not been used for the formation of the powder layer, is directly returned into the fabrication chamber, thus reducing degradation of powder.

Further, unused powder is not discharged outside the supply chamber and the fabrication chamber. Such a configuration obviates a surplus powder receptacle to store surplus powder and a collection mechanism to collect powder from the surplus powder receptacle and return the powder to the supply chamber, thus reducing an increase of the size of the apparatus.

Next, a second embodiment of the present disclosure is described with reference to FIGS. 7A to 7F. FIGS. 7A to 7F are illustrations of the operation of forming the powder layer in the fabrication section under the control of the controller in the second embodiment.

Figure 7A:
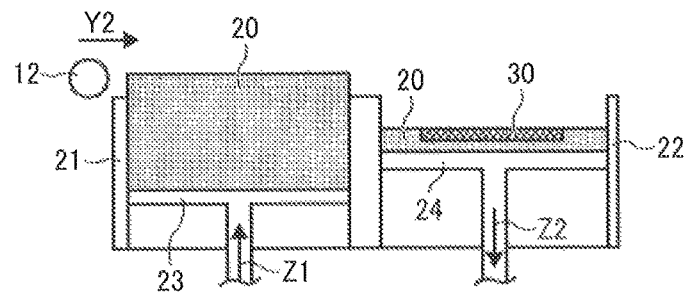
FIGS. 7A to 7F are illustrations of the operation of forming the powder layer in the fabrication section under control of the controller in a second embodiment.

As illustrated in FIG. 7A, the supply stage 23 of the supply chamber 21 moves upward by the movement amount z1 in the Z1 direction, and the fabrication stage 24 of the fabrication chamber 22 moves downward by the movement amount z2 in the Z2 direction. Then, the flattening roller 12 starts to move in the Y2 direction.

Figure 7B:
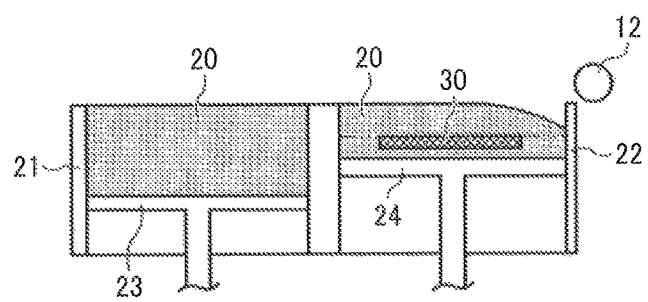

As illustrated in FIG. 7B, the powder 20 is transferred and supplied from the supply chamber 21 to the fabrication chamber 22 by the movement of the flattening roller 12 in the Y2 direction (powder supply).

Figure 7C:
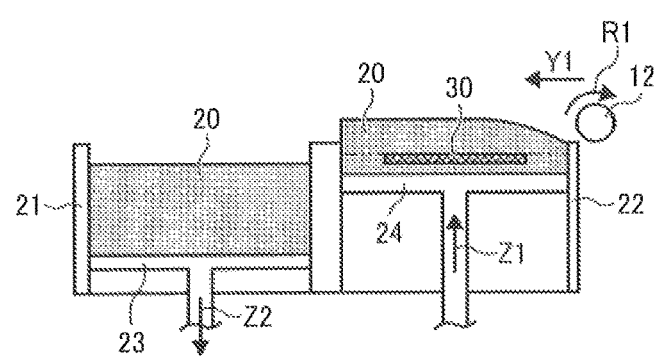

Next, as illustrated in FIG. 7C, the supply stage 23 of the supply chamber 21 moves downward by a movement amount z3 in the Z2 direction, and the fabrication stage 24 of the fabrication chamber 22 moves upward by a movement amount z4 in the Z1 direction.

Then, rotation drive of the flattening roller 12 is started and the flattening roller 12 starts to move in the Y1 direction.

Figure 7D:
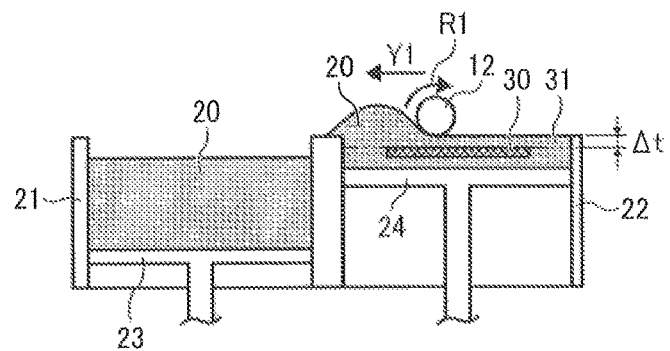

Accordingly, as illustrated in FIGS. 7C and 7D, the flattening roller 12, while rotating in a direction indicated by arrow R1, moves in the Y1 direction to from the powder layer 31 at a predetermined thickness $\Delta t1$ on the fabrication layer 30 of the fabrication stage 24. A surplus of the powder 20, which has not been used for the formation of the powder layer 31, is returned into the supply chamber 21.

Figure 7E:
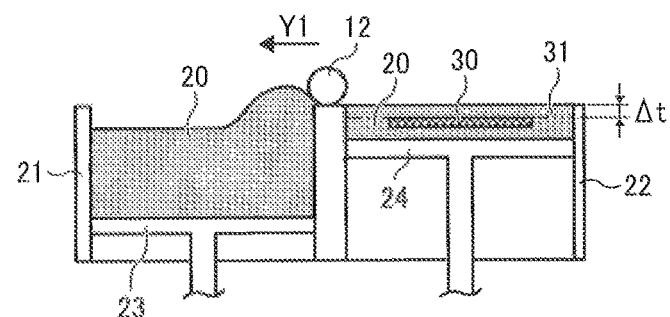
Figure 7F:
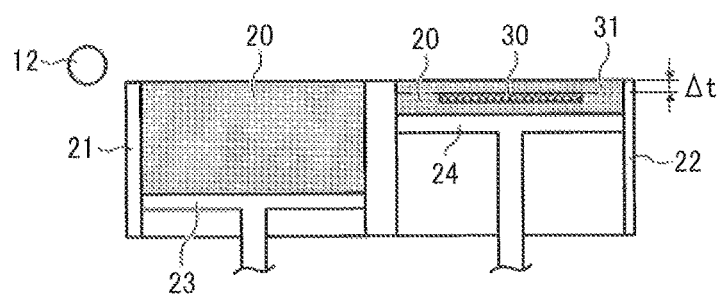

As illustrated in FIG. 7E, after the formation of the powder layer 31 at the thickness $\Delta t$, the flattening roller 12 passes the fabrication chamber 22 and the rotation drive of the flattening roller 12 is stopped. The flattening roller 12 further moves in the Y1 direction. As illustrated in FIG. 7F, the flattening roller 12 returns to the initial position (original position).

Then, similarly with the first embodiment, the process goes to an operation (fabricating operation) of discharging droplets of fabrication liquid 10 from the heads 52 to form and laminate a desired shape of the next fabrication layer 30 on the powder layer 31. The formation of the powder layer 31 and the fabrication of the fabrication layer 30 are repeated to form a three-dimensional object.

For the present embodiment, when the flattening roller 12 moves backward (in the Y1 direction) to form the powder layer 31 by flattening, the flattening roller 12 is rotated in the R1 direction in passing over the fabrication chamber 22. After the fabrication chamber 22 passes the fabrication chamber 22, the rotation drive of the flattening roller 12 is stopped.

As described above, by moving the flattening roller 12 while rotating the flattening roller 12, the powder layer 31 can be formed with a high degree of flatness. The rotation drive of the flattening roller 12 is stopped except when the powder layer 31 is formed (the flattening roller 12 passes above the fabrication stage 24). Such a configuration can reduce noise and power consumption.

A greater amount of the powder 20 than an amount required to form the powder layer 31 by one layer is transferred and supplied from the supply chamber 21 to the fabrication chamber 22. For such a configuration, the movement of the flattening roller 12 in the Y2 direction, the flatness of the supply chamber 21 and the fabrication chamber 22 after the movement of the flattening roller 12 in the Y2 direction, the flatness of the supply chamber 21 after the movement of the flattening roller 12 in the Y1 direction less affect the flatness of the powder layer 31 and the quality of the fabrication object.

Figure 8:
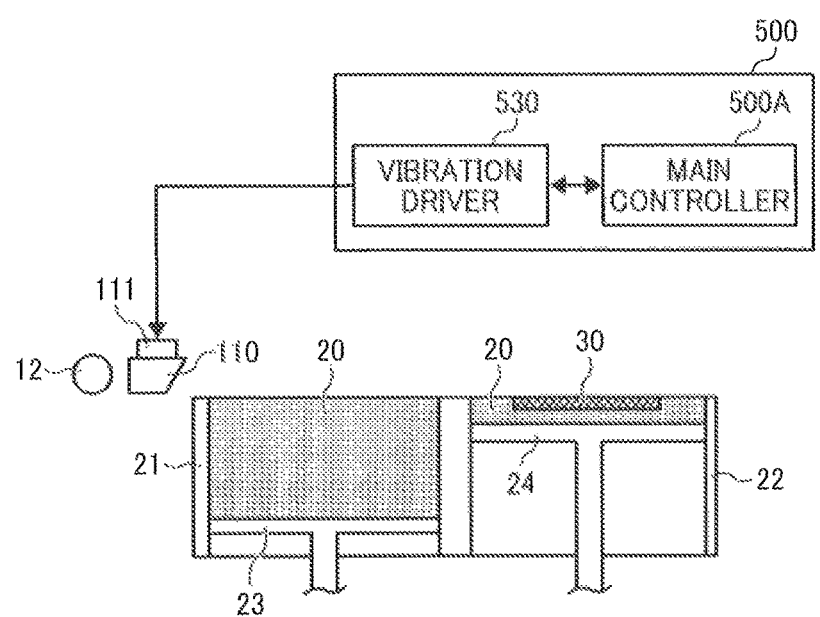
FIG. 8 is an illustration of the fabrication section and the controller according to a third embodiment of the present disclosure.

Next, a third embodiment of the present disclosure is described with reference to FIG. 8. FIG. 8 is an illustration of the fabrication section and the controller according to the third embodiment.

In the third embodiment, a blade 110 is disposed forward in a direction of movement of the flattening roller 12. The blade 110 moves with the flattening roller 12 when the flattening roller 12 moves in the Y2 direction, in other words, when the powder 20 is transferred and supplied from the supply chamber 21 to the fabrication chamber 22. A vibrator 111 as a vibration generator is mounted on the blade 110.

The vibrator 111 is controlled by the main controller 500A via a vibration driver 530 of the controller 500. Note that the configurations of the controller 500 and other components are similar to, even if not the same as, the configurations of the above-described first embodiment.

Next, control of the operation of forming the powder layer performed by the controller in the third embodiment of the present disclosure is described with reference to FIGS. 9A to 9F. FIGS. 9A to 9F are illustrations of the operation of forming the powder layer in the fabrication section under the control of the controller in the third embodiment.

Figure 9A:
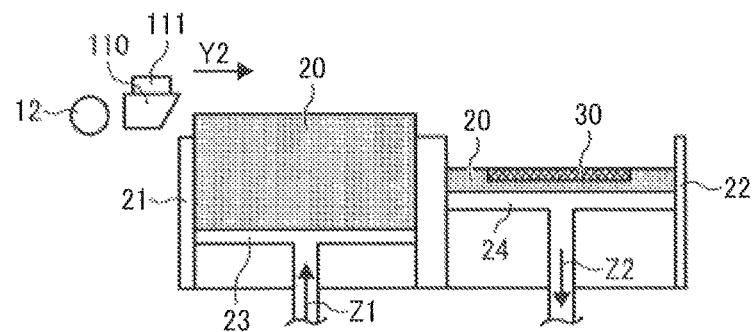
FIGS. 9A to 9F are illustrations of the operation of forming the powder layer in the fabrication section under the control of the controller in the third embodiment.

First, as illustrated in FIG. 9A, the supply stage 23 of the supply chamber 21 moves upward by the movement amount z1 in the Z1 direction, and the fabrication stage 24 of the fabrication chamber 22 moves downward by the movement amount z2 in the Z2 direction. Then, with the blade 110 being vibrated by driving of the vibrator 111, the flattening roller 12 is started to move with the blade 110 in the Y2 direction.

Figure 9B:
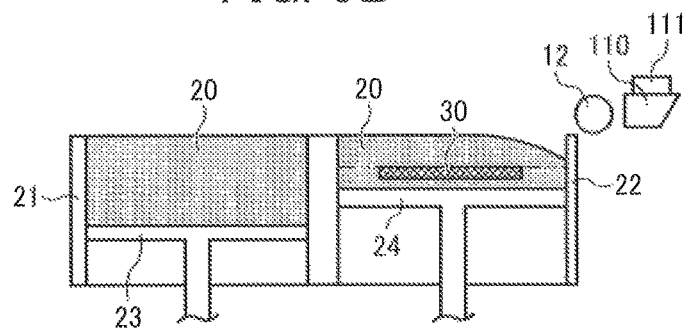

As illustrated in FIG. 9B, the powder 20 is transferred and supplied from the supply chamber 21 to the fabrication chamber 22 by the movement of the blade 110 and the flattening roller 12 in the Y2 direction (powder supply). At this time, the blade 110 taps the powder 20. After passing the fabrication chamber 22, the vibration of the blade 110 is stopped.

Figure 9C:
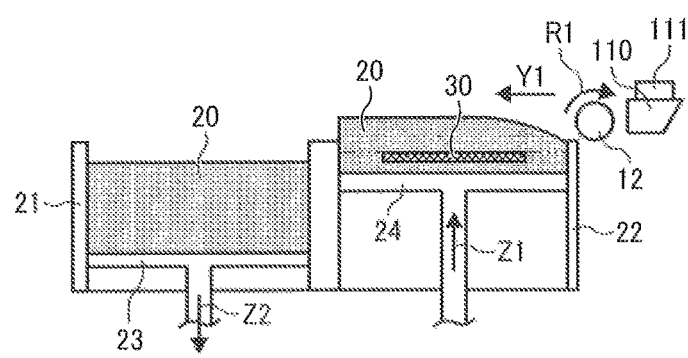

Next, as illustrated in FIG. 9C, the supply stage 23 of the supply chamber 21 moves downward by the movement amount z3 in the Z3 direction, and the fabrication stage 24 of the fabrication chamber 22 moves upward by the movement amount z4 in the Z1 direction.

Then, rotation drive of the flattening roller 12 is started and the flattening roller 12 starts to move in the Y1 direction.

Figure 9D:
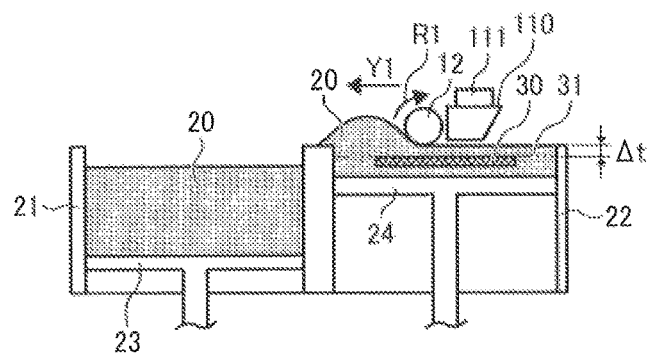

Accordingly, as illustrated in FIGS. 9C and 9D, the flattening roller 12, while rotating in the direction indicated by arrow R1, moves in the Y1 direction to from the powder layer 31 at the predetermined thickness Δt1 on the fabrication layer 30 of the fabrication stage 24. A surplus of the powder 20, which has not been used for the formation of the powder layer 31, is returned into the supply chamber 21.

Figure 9E:
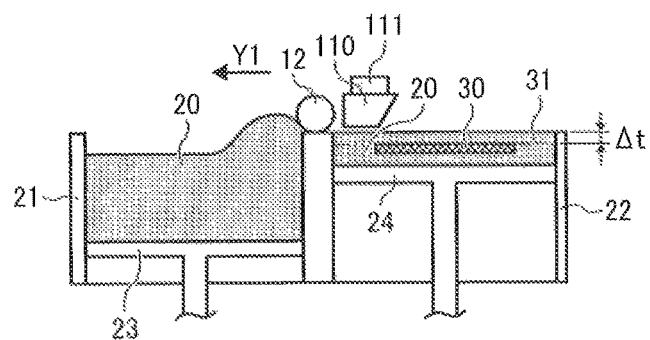
Figure 9F:
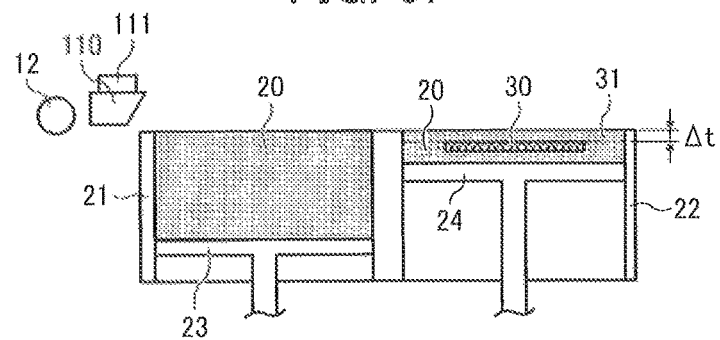

As illustrated in FIG. 9E, after the formation of the powder layer 31 at the thickness Δt, the flattening roller 12 passes the fabrication chamber 22 and the rotation drive of the flattening roller 12 is stopped. The flattening roller 12 further moves in the Y1 direction. As illustrated in FIG. 9F, the flattening roller 12 returns to the initial position (original position).

Then, similarly with the first embodiment, the process goes to an operation (fabricating operation) of discharging droplets of fabrication liquid 10 from the heads 52 to form and laminate a desired shape of the next fabrication layer 30 on the powder layer 31. The formation of the powder layer 31 and the fabrication of the fabrication layer 30 are repeated to form a three-dimensional object.

As described above, by transferring and supplying the powder 20 while tapping the powder 20 with the vibrating blade 110 as a vibration applicator, the powder 20 is supplied into the fabrication chamber 22 at a high density state. Such a configuration allows the powder layer 31 to be formed at high density and high degree of flatness.

A greater amount of the powder 20 than an amount required to form the powder layer 31 by one layer is transferred and supplied from the supply chamber 21 to the fabrication chamber 22. Accordingly, the blade 110 is placed away from the preceding fabrication layer 30 at a greater distance than the lamination pitch of the powder layer 31.

Accordingly, when the powder 20 is supplied to the fabrication chamber 22 while the powder 20 is tapped by vibration of the blade 110, using an increased vibration energy allows the powder layer 31 to be formed at high density without adverse effects (misalignment and damage) on the existing powder layer 31.

Figure 10:
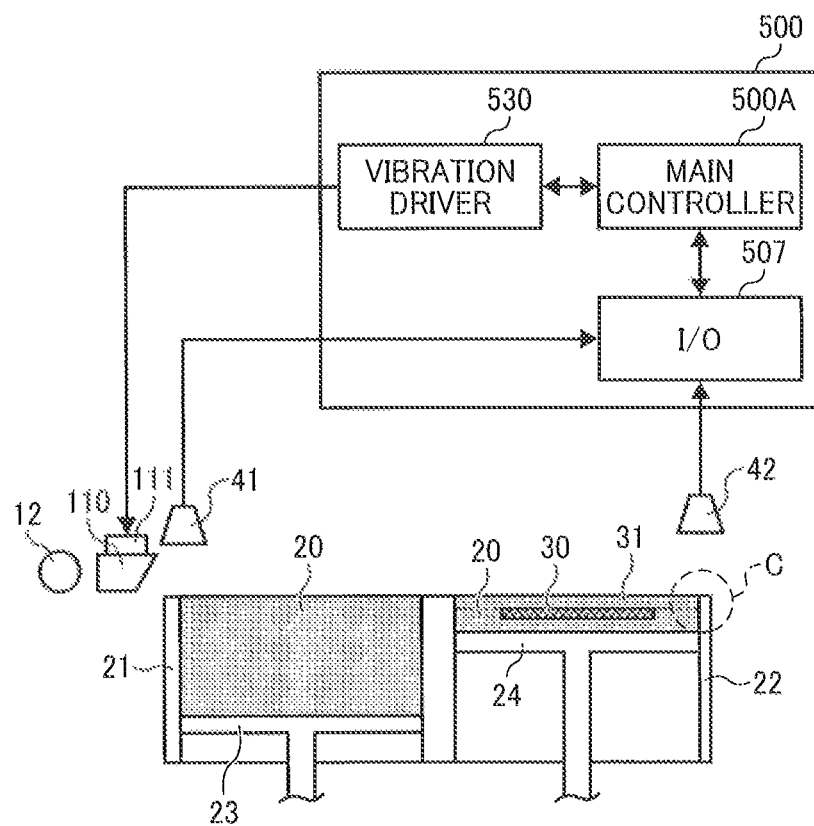
FIG. 10 is an illustration of the fabrication section and the controller in a fourth embodiment of the present disclosure.

Next, a fourth embodiment of the present disclosure is described with reference to FIG. 10. FIG. 10 is an illustration of the fabrication section and the controller in the fourth embodiment.

For the present embodiment, a first displacement detector 41 is provided to detect a Z-direction position of a surface of the powder 20 on an end of the supply chamber 21 at a side opposite the fabrication chamber 22 in the direction of movement of the flattening roller 12. Similarly, a second displacement detector 42 is provided to detect a Z-direction position of the surface of the powder 20 on an end of the fabrication chamber 22 at a side opposite the supply chamber 21 in the direction of movement of the flattening roller 12.

A detection signal of each of the first displacement detector 41 and the second displacement detector 42 is input to the I/O unit 507 of the controller 500. In the controller 500, the Z-directional position of the surface of the powder 20 detected with the first displacement detector 41 is stored and retained in, e.g., the NVRAM 504 (see FIG. 5).

Figure 11:
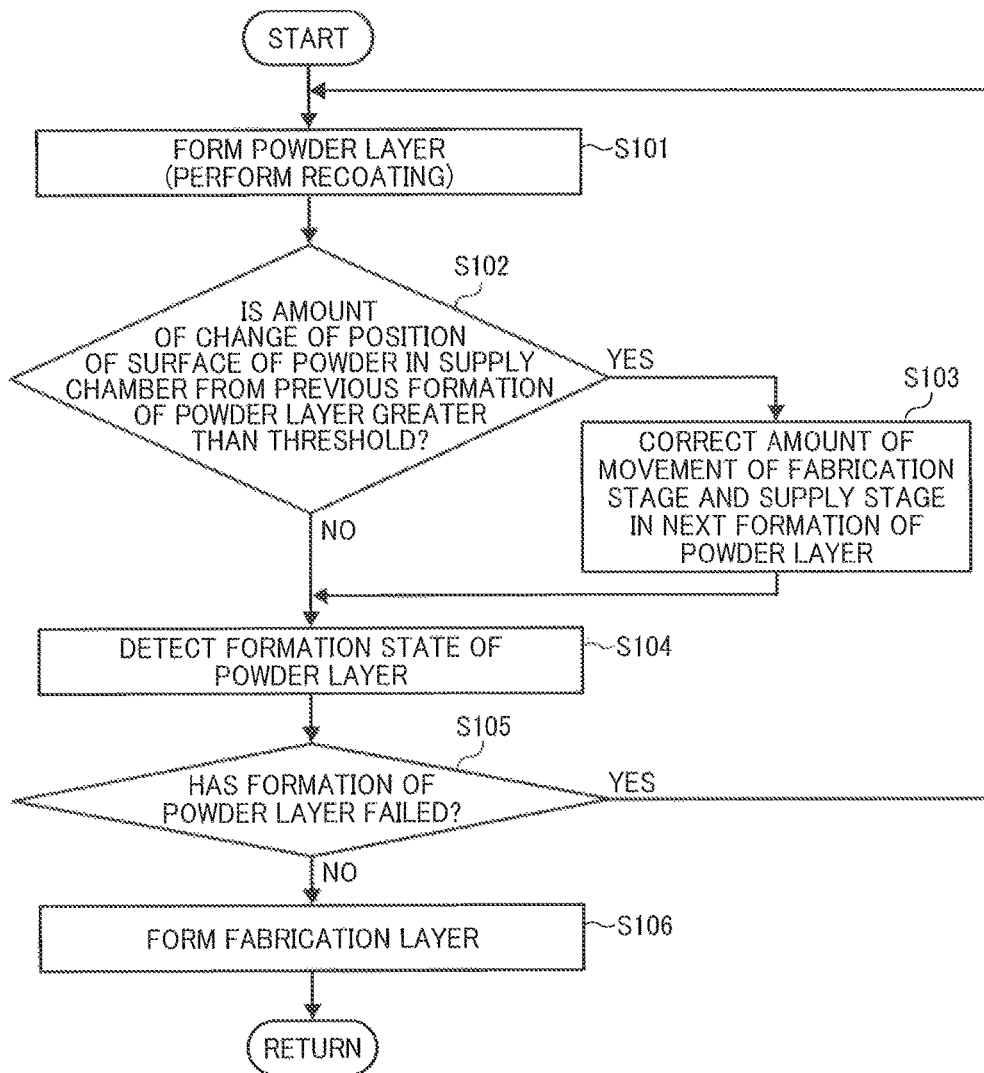
FIG. 11 is a flowchart of fabrication control of the controller in the fourth embodiment.
Figure 12A:
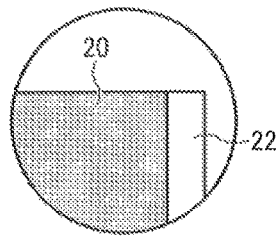
FIGS. 12A and 12B are illustrations of formation states of the powder layer.
Figure 12B:
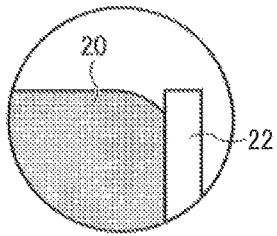

Next, fabrication control performed by the controller in the fourth embodiment is described with reference to FIG. 11, FIG. 12A, and FIG. 12B. FIG. 11 is a flowchart of the fabrication control in the fourth embodiment. FIGS. 12A and 12B is an illustration of formation states of the powder layer in an area corresponding to an area indicated by broken line C in FIG. 10.

As described in FIG. 11, formation (recoating) of the powder layer 31 is performed in a similar manner to the third embodiment (S101).

The controller 500 causes the first displacement detector 41 to detect the Z directional position of the surface of the powder 20 after the powder layer 31 is formed in the supply chamber 21. The controller 500 compares the Z-directional position detected with the first displacement detector 41 with a Z-directional position of the surface of the powder in the previous powder supply, which is stored and retained in, for example, the NVRAM 504. The controller 500 determines whether the amount of change (difference) of the Z-directional position of the surface of the powder 20 in the supply chamber 21 from the previous powder supply is greater than a predetermined threshold (S102).

When the amount of change (difference) of the Z-directional position from the previous powder supply is greater than the threshold (YES at S102), at S103 the controller 500 changes the movement amount z1 and the movement amount z2 of the supply stage 23 and the fabrication stage 24 in the next recoating to make a correction to even the difference between the Z-directional position stored and retained and the Z-directional position detected.

Then or when the amount of change (difference) of the Z-directional position from the previous powder supply is not greater than the threshold (NO at S102), the controller 500 causes the second displacement detector 42 to detect an end of the powder layer 31 (S104) and determines whether formation of the powder layer 31 has failed (S105).

In other words, when a detection result of the end of the powder layer 31 with the second displacement detector 42 indicates, for example, a state illustrated in FIG. 12A, the controller 500 determines that the formation of the powder layer 31 has normally performed. When the detection result indicates a state illustrated in FIG. 12B, the controller 500 determines that the formation of the powder layer 31 has failed.

When the formation of the powder layer 31 has failed (YES at S105), the process goes back to S101 to form the powder layer 31 again.

When the formation of the powder layer 31 has normally performed (NO at S105), at S106 the controller 500 causes the heads 52 to discharge liquid to form the fabrication layer 30.

Such fabrication control can reliably prevent formation failure of a thin layer even if the fabricating operation is repeated and formation of the powder layer (recoating) and liquid discharge are performed. Accordingly, even if a change in the contract amount of the fabrication layer 30 or the bulk density of the powder 20 after liquid discharge is caused by a change in the shape of the fabrication object or the atmospheric environment, the formation of the powder layer and the fabrication of the fabrication layer can be continuously and stably repeated.

Figure 13:
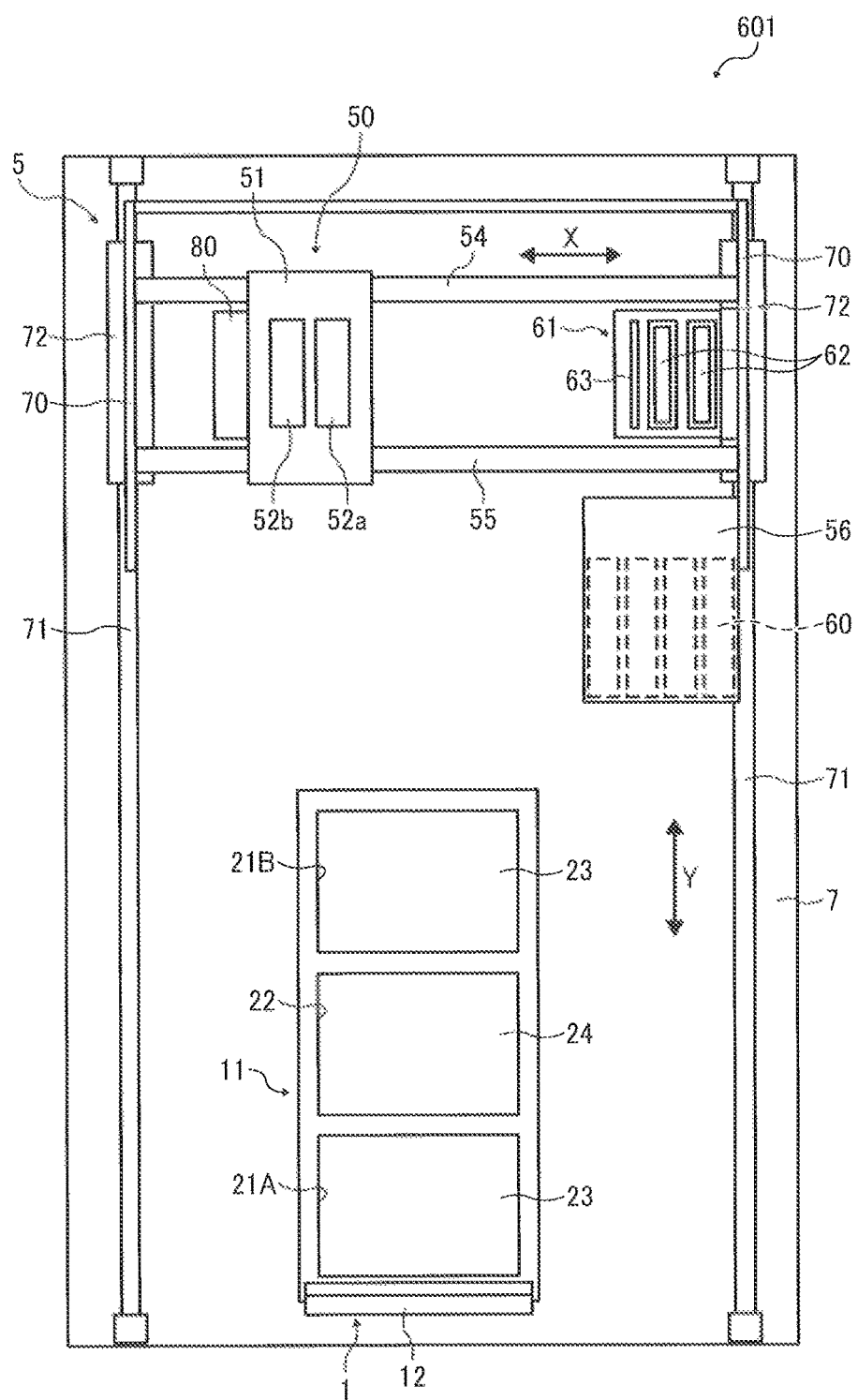
FIG. 13 is a plan view of the three-dimensional fabricating apparatus according to a fifth embodiment of the present disclosure.
Figure 14:
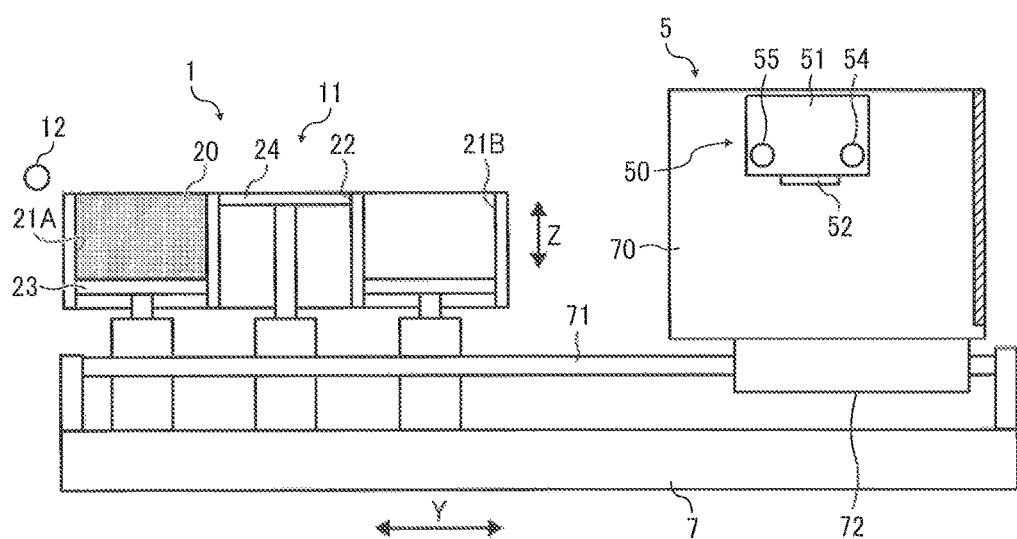
FIG. 14 is a cross-sectional view of the fabrication section of the three-dimensional fabricating apparatus of FIG. 13.
Figure 15:
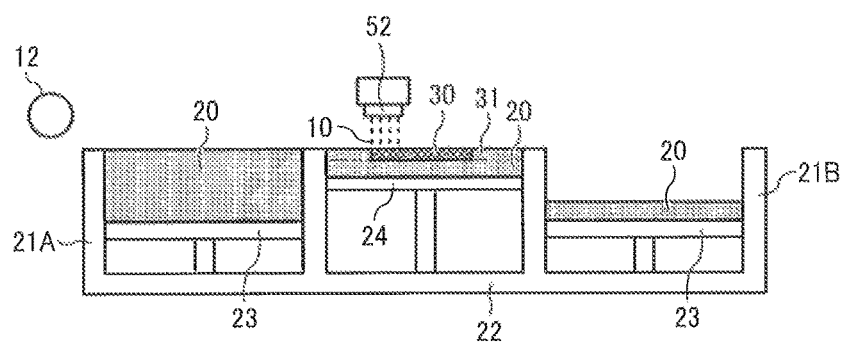
FIG. 15 is a cross-sectional view of the fabrication section of FIG. 14.

Next, an example of the three-dimensional fabricating apparatus according to a fifth embodiment of the present disclosure is described with reference to FIGS. 13 through 15. FIG. 13 is a plan view of the three-dimensional fabricating apparatus according to the fifth embodiment of the present disclosure. FIG. 14 is a cross-sectional view of the fabrication section of the three-dimensional fabricating apparatus of FIG. 13. FIG. 15 is a cross-sectional view of the fabrication section of FIG. 14.

The three-dimensional fabricating apparatus 601 according to the fifth embodiment includes the fabrication chamber 22, a supply chamber 21A, and a supply chamber 21B in the powder chamber 11. The supply chamber 21A and the supply chamber 21B (referred to as supply chambers 21 unless distinguished) to store the powder 20 are disposed at opposed ends of the fabrication chamber 22 in the direction of movement of the flattening roller 12.

The flattening roller 12 is disposed to be reciprocally movable above the supply chamber 21A, the fabrication chamber 22, and the supply chamber 21B. The flattening roller 12 as a flattening unit transfers the powder 20 from the supply chamber 21A or the supply chamber 21B to the fabrication chamber 22 and flattens the powder 20 supplied to the fabrication chamber 22, to form the powder layer 31.

Figure 16:
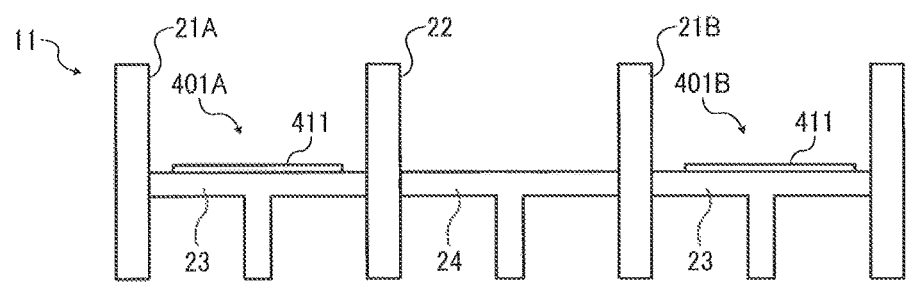
FIG. 16 is a side view of a powder chamber section including a stirrer in a supply chamber in the fifth embodiment.
Figure 17:
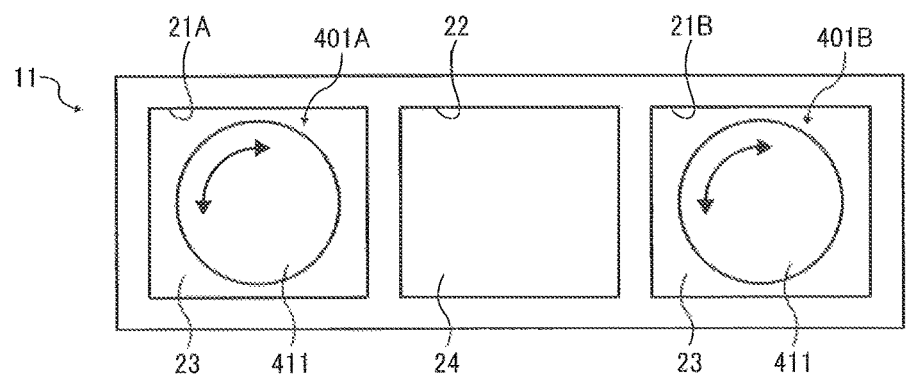
FIG. 17 is a plan view of the powder chamber section of FIG. 16.

Next, a stirrer in the supply chamber in the fifth embodiment is described with reference to FIGS. 16 and 17. FIG. 16 is a side view of a powder chamber section in the fifth embodiment. FIG. 17 is a plan view of the powder chamber section of FIG. 16.

In the present embodiment, a rotary plate 411 of a stirrer 401A is rotatably disposed on the supply stage 23 of the supply chamber 21A. Similarly, another rotary plate 411 of a stirrer 401B is rotatably disposed on the supply stage 23 of the supply chamber 21B.

The rotary plate 411 is rotatable in both forward and reverse directions and adjustable with respect to the rotation speed.

Note that other configurations are similar to, even if not the same as, the configurations of the above-described first embodiment.

Figure 18:
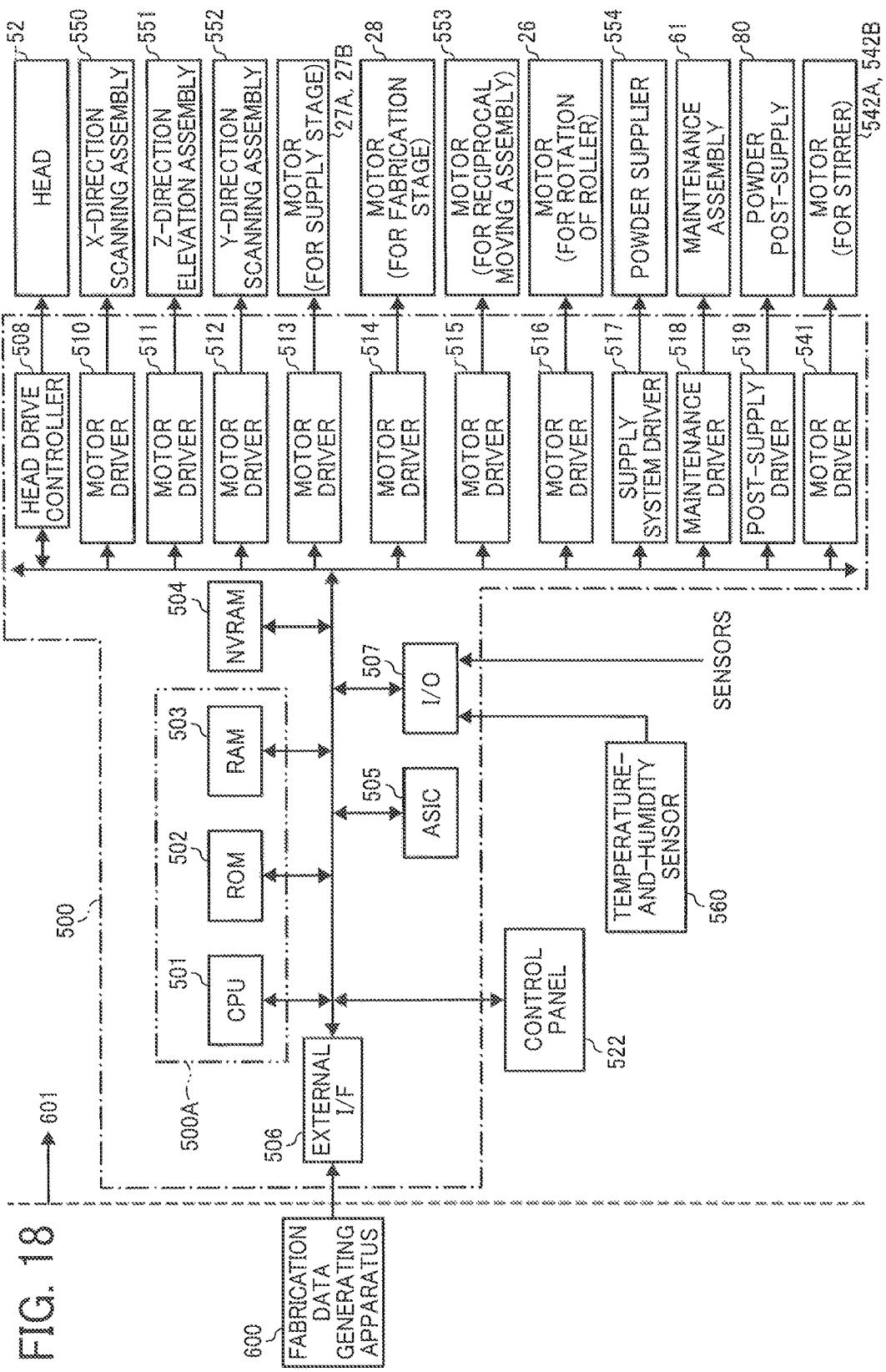
FIG. 18 is a block diagram of the controller of the three-dimensional fabricating apparatus according to the fifth embodiment.

Next, an outline of the controller of the three-dimensional fabricating apparatus according to the fifth embodiment is described with reference to FIG. 18. FIG. 18 is a block diagram of the controller of the three-dimensional fabricating apparatus according to the fifth embodiment.

The controller 500 includes a motor driver 513 and a motor driver 541. The motor driver 513 separately drives a motor 27A and a motor 27B to move the supply stage 23 of the supply chamber 21A and the supply stage 23 of the supply chamber 21B, respectively. The motor driver 541 separately drives a motor 542A and a motor 542B to rotate the rotary plate 411 of the stirrer 401A and the rotary plate 411 of the stirrer 401B, respectively.

Note that other configurations are similar to, even if not the same as, the configurations of the controller 500 according to the above-described first embodiment.

Next, control of the operation of forming the powder layer performed by the controller in the fifth embodiment of the present disclosure is described with reference to FIGS. 19 and 20. FIG. 19 is a flowchart of the control of the operation of forming the powder layer in the fifth embodiment. FIGS. 20A and 20B are illustrations of the control of FIG. 19.

In the present embodiment, when the powder 20 is supplied from one of the supply chamber 21A and the supply chamber 21B to the fabrication chamber 22, the other of the supply chamber 21A and the supply chamber 21B acts as a collection chamber to receive and store unused powder 20. Therefore, when a supply side and a collection side are distinguished between the supply chamber 21A and the supply chamber 21B, the supply side to supply the powder 20 to the fabrication chamber 22 with the flattening roller 12 is referred to as the supply-side supply chamber 21 and the collection side to collect unused powder 20 is referred to as the collection-side supply chamber 21.

In FIG. 19, at S201 the controller 500 aligns the height of each of the supply stage 23 of the supply chamber 21A and the supply stage 23 of the supply chamber 21B with the height of the supply-side supply chamber 21.

For example, the supply amount of the powder 20 supplied from the supply-side supply chamber 21 and the collection amount of the powder 20 stored in the collection-side supply chamber 21 decrease by an amount of powder used to form one layer of the powder layer 31.

Hence, aligning the height of each of the supply stage 23 of the supply chamber 21A and the supply stage 23 of the supply chamber 21B with the height of the supply-side supply chamber 21 can prevent the volume of the collection-side supply chamber 21 from being filled up with unused powder 20 generated in formation of the powder layer 31. Such a configuration can prevent occurrence of discharge failure due to contact of the nozzle face with the powder 20 when the heads 52 passes above the collection-side supply chamber 21.

At S202, without raising the fabrication stage 24 of the fabrication chamber 22, the controller 500 transfers the powder 20 of one layer or more from the supply-side supply chamber 21 to the collection-side supply chamber 21 (referred to as discard recoating). The discard recoating is performed to maintain the amount of the powder 20 supplied from the supply-side supply chamber 21 constant when the supply side and the collection side are switched.

At S203, the powder layer 31 is formed at a predetermined thickness.

Here, the supply stage 23 of the supply-side supply chamber 21 is raised at a desired amount, and the fabrication stage 24 of the fabrication chamber 22 is moved downward at a predetermined amount (corresponding to the thickness Δt of the powder layer 31). The flattening roller 12 moves in the Y direction to supply the powder 20 from the supply-side supply chamber 21 to the fabrication chamber 22 and form the powder layer 31 at the thickness Δt. At this time, the flattening roller 12 moves above the collection-side supply chamber 21 and unused powder 20 is stored and collected into the collection-side supply chamber 21.

At S204, the rotary plate 411 as the stirrer 401 of the collection-side supply chamber 21 is reciprocally rotated in both forward and backward directions to stir and even the collected powder 20.

At S205, the controller 500 determines whether the supply stage 23 of the supply-side supply chamber 21 has reached (risen up to) a predetermined height.

When the supply stage 23 of the supply-side supply chamber 21 has not reached the predetermined height (NO at S205), at S203 the powder layer 31 is formed using the powder 20 of the supply-side supply chamber 21 and at S204 the powder 20 stored in the collection-side supply chamber 21 is stirred and evened again.

Alternatively, when the supply stage 23 of the supply-side supply chamber 21 has reached the predetermined height (YES at S205), at S206 the controller 500 determines whether the current collection-side supply chamber 21 is the supply chamber 21B.

When the current collection-side supply chamber 21 is the supply chamber 21B (YES at S206), at S210 the flattening roller 12 moves to the initial position of the supply chamber 21B.

At S211, the supply stage 23 is raised until the powder 20 heaves from the supply chamber 21B.

At S212, the supply chamber 21B is switched and set to the supply-side supply chamber 21 and the supply chamber 21A is switched and set to the collection-side supply chamber 21. At S213, the controller 500 determines whether the fabricating operation is to be terminated.

Alternatively, when the current collection-side supply chamber 21 is not the supply chamber 21B (NO at S206), in other words, the current collection-side supply chamber 21 is the supply chamber 21A, at S207 the flattening roller 12 moves to the initial position of the supply chamber 21A.

At S208, the supply stage 23 is raised until the powder 20 heaves from the supply chamber 21A.

At S209, the supply chamber 21A is switched and set to the supply-side supply chamber 21 and the supply chamber 21B is switched and set to the collection-side supply chamber 21. At S213, the controller 500 determines whether the fabricating operation is to be terminated.

As described above, using the two supply chambers including the stirrers, unused powder not used for formation of the powder layer is stored and stirred to even the stored powder.

Figures 20A, 20B:
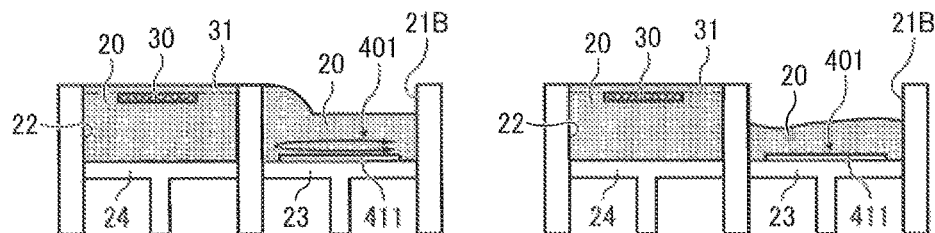
FIGS. 20A and 20B are illustrations of the control of FIG. 19.

For example, as illustrated in FIG. 20A, when the flattening roller 12 forms the powder layer 31, unused powder 20, which has not been used for the formation of the powder layer 31, is stored into, for example, the supply chamber 21B when the collection-side supply chamber 21 is the supply chamber 21B.

Then, as illustrated in FIG. 20B, the rotary plate 411 as the stirrer 401B is rotated to even the powder 20 stored in the supply chamber 21B.

In other words, of the powder 20 supplied from the supply-side supply chamber 21, unused powder 20, which has not been used for the formation of the powder layer 31, is transferred to the collection-side supply chamber 21. At this time, unused powder 20 having passed the fabrication chamber 22 falls along a wall of the collection-side, supply chamber 21 proximate to the fabrication chamber 22.

Accordingly, unused powder 20 collectively accumulates on the wall of the collection-side supply chamber 21 proximate to the fabrication chamber 22. The accumulated powder 20 does not collapse unless the accumulated powder 20 exceeds the angle of rest deriving from the material of powder. As a result, even if the supply chamber 21 still has a room to store unused powder 20, unused powder 20 may partially heave beyond the opening of the supply chamber 21 to an area above the supply chamber 21.

When the collection-side supply chamber 21 and the supply-side supply chamber 21 are switched, such uneven accumulation of the powder 20 in the supply chamber 21 may hamper constant regulation of the supply amount immediately after the switching.

Hence, according to the present embodiment, the stirrer 401 is disposed on the supply stage 23 of the supply chamber 21 to stir the powder 20 in the collection-side supply chamber 21 during collection of the powder 20, thus preventing the collected powder 20 from heaving beyond the opening of the collection-side supply chamber 21. Stirring the powder 20 in the collection-side supply chamber 21 can also reduce the unevenness in density of the collected powder 20 and the degradation of the powder 20 to be re-supplied.

Here, the rotary plate 411 as the stirrer 401 is rotated during a time period in which the powder layer 31 is laminated by at least one layer.

Such a configuration allows the accumulated powder 20 to collapse and be evenly flattened to some extent. Since the rotary plate 411 of the supply stage 23 is rotated by the same assembly, the degree of stirring of powder can be maintained constant even when the collection-side supply chamber 21 is switched. Accordingly, conditions, such as amount and density, of the powder 20 supplied can be maintained constant, thus allowing the quality of the fabrication object to be maintained constant.

When the supply-side supply chamber 21 and the collection-side supply chamber 21 are switched, as described above, discard recoating is performed to transfer the powder 20 of an amount of one layer or more from the supply-side supply chamber 21 to be set to the supply side after the switching, to the collection-side supply chamber 21 to be set to the collection side after the switching, without raising the fabrication stage 24 of the fabrication chamber 22.

In other words, even when the powder 20 stored in the collection-side supply chamber 21 is stirred with the stirrer, the flatness of the surface of the powder 20 may not be sufficient. On the other hand, to maintain the supply amount of the powder 20 constant, the powder 20 is preferably leveled off on the upper portion of the supply chamber 21.

Hence, without changing the height of the fabrication stage 24, the supply stage 23 of the supply chamber 21, which is subsequently set to the supply side, is raised and discard recoating is performed to level off the powder 20 with the flattening roller 12. Such a configuration allows the powder 20 to be conveyed at a constant amount without changing the supply amount of the powder 20 on the resumption of fabrication.

During discard recoating or after the end of discard recoating, the height of the supply stage 23 of the supply chamber 21 to be subsequently set to the collection side is aligned with the height of the supply stage 23 of the supply chamber 21 to be subsequently set to the supply side. Then, formation of the powder layer 31 and fabrication of the fabrication layer 30 are resumed.

By repeating the process until the fabrication is terminated, the powder can be reused while maintaining a constant supply amount of the powder.

Figure 21:
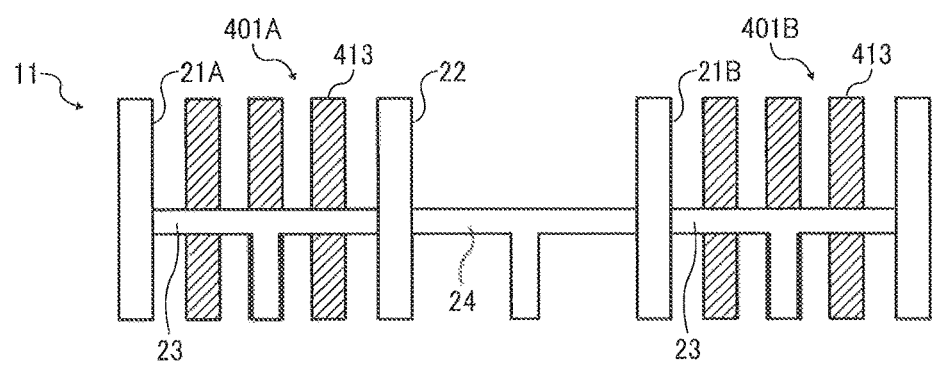
FIG. 21 is a side view of the powder chamber in a sixth embodiment of the present disclosure.
Figure 22:
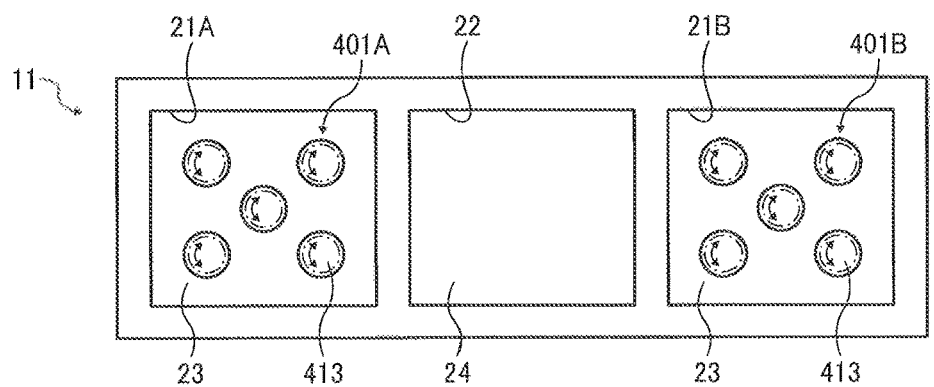
FIG. 22 is a plan view of the powder chamber of FIG. 21.

Next, a sixth embodiment of the present disclosure is described with reference to FIGS. 21 and 22. FIG. 21 is a side view of the powder chamber in the sixth embodiment. FIG. 22 is a plan view of the powder chamber of FIG. 21.

As the stirrer 401, a plurality of columns 413 stands vertically with respect to the supply stage 23. The circumferential surface of the column 413 has a screw shape. The supply stage 23 moves upward and downward with rotation of the columns 413.

Figure 23A:
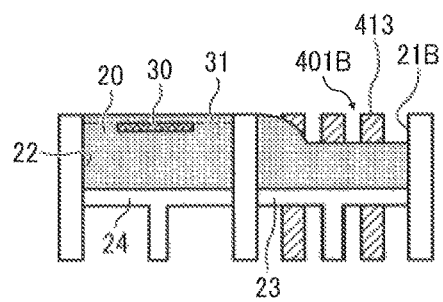
FIGS. 23A and 23B are side views of the fabrication section in the sixth embodiment.
Figure 23B:
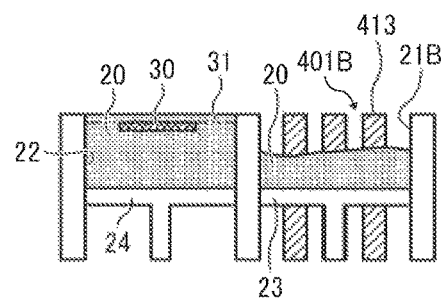

Next, the operation of the sixth embodiment is described with reference to FIGS. 23A and 23B. FIGS. 23A and 23B are side views of the fabrication section in the sixth embodiment.

As illustrated in FIG. 23A, unused powder 20 having not been used for the formation of the powder layer 31 is transferred and stored into the collection-side supply chamber 21 (for example, the supply chamber 21B in FIG. 23A). Then, the column 413 as the stirrer 401 is rotated forward and in reverse at an interval corresponding to at least one lamination operation.

With such a configuration, as the supply stage 23 moves upward and downward, the powder 20 at a side face of the columns 413 is moved by rotation of the columns 413. Accordingly, the powder 20 accumulated near the columns 413 collapses and, as illustrated in FIG. 23B, the powder 20 is evenly flattened to some extent.

At this time, since the same stirrer 401A is used to stir the powder 20, the degree of stirring of the powder 20 can be maintained constant even when the collection-side supply chamber 21 is switched.

Accordingly, conditions, such as amount and density, of the powder 20 supplied can be maintained constant, thus allowing the fabrication quality to be maintained constant.

Figure 24:
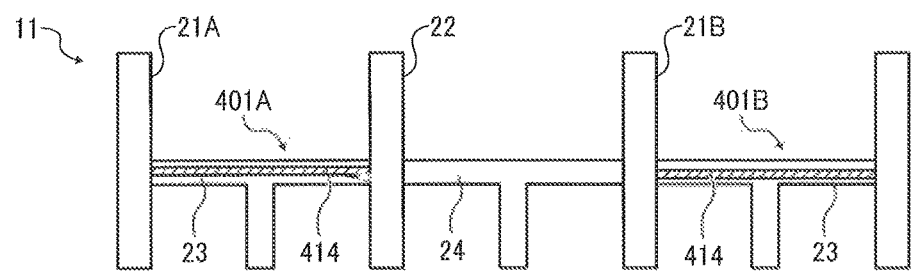
FIG. 24 is a side view of the powder chamber in a seventh embodiment.
Figure 25:
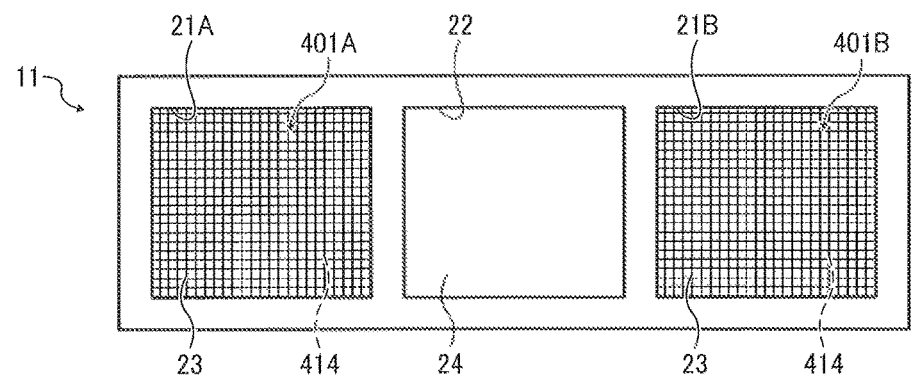
FIG. 25 is a plan view of the powder chamber of FIG. 24.

Next, a seventh embodiment of the present disclosure is described with reference to FIGS. 24 and 25. FIG. 24 is a side view of the powder chamber in the seventh embodiment. FIG. 25 is a plan view of the powder chamber of FIG. 24.

As the stirrer 401, a shaker 414 is disposed inside the supply stage 23. The shaking direction of the shaker 414 may be any of a direction parallel to the surface of the supply stage 23 and a direction perpendicular to the surface of the supply stage 23.

Figure 26A:
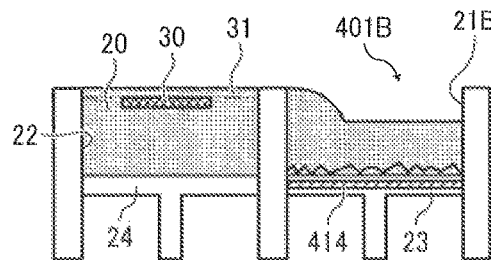
FIGS. 26A and 26B are side views of the fabrication section in the seventh embodiment.
Figure 26B:
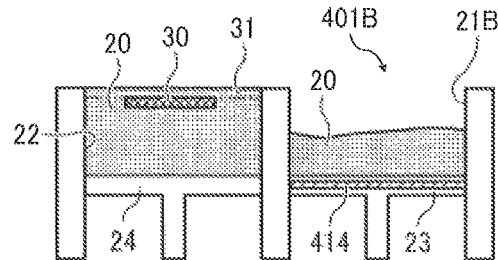

Next, the operation of the seventh embodiment is described with reference to FIGS. 26A and 26B. FIGS. 26A and 26B are side views of the fabrication section in the seventh embodiment.

As illustrated in FIG. 26A, unused powder 20 having not been used for the formation of the powder layer 31 is transferred and stored into the collection-side supply chamber 21 (for example, the supply chamber 21B in FIG. 26A). The shaker 414 as the stirrer 401 shakes the powder 20 stored in the collection-side supply chamber 21.

Such a configuration allows the powder 20 accumulated on the supply stage 23 to collapse and be evenly flattened to some extent.

At this time, since the same stirrer 401A is used to stir the powder 20, the degree of stirring of the powder 20 can be maintained constant even when the collection-side supply chamber 21 is switched.

Accordingly, conditions, such as amount and density, of the powder 20 supplied can be maintained constant, thus allowing the fabrication quality to be maintained constant.

Figure 27A:
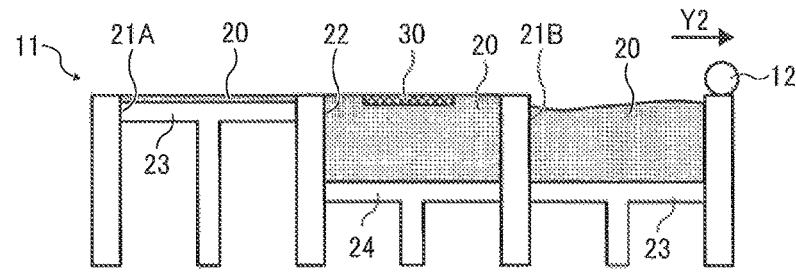
FIGS. 27A to 27C are illustrations of the fabrication section in the seventh embodiment.
Figure 27B:
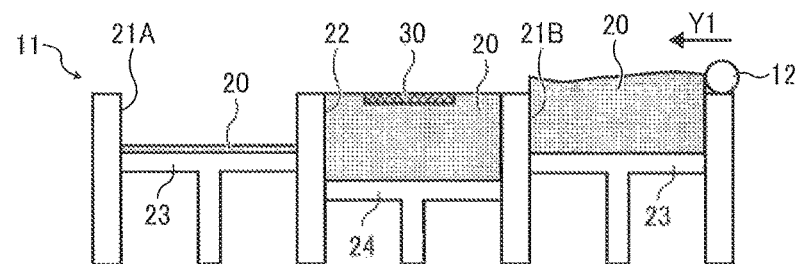
Figure 27C:
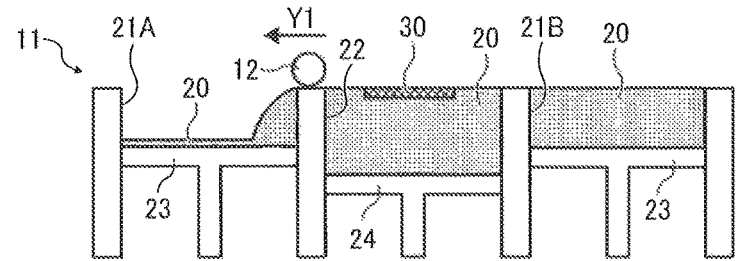

Next, the switching of the supply-side supply chamber and the collection-side supply chamber is described with reference to FIGS. 27A to 27C. FIGS. 27A to 27C are illustrations of the fabrication section in the seventh embodiment.

As illustrated in FIG. 27A, when the supply stage 23 (for example, the supply chamber 21A in FIG. 27A) of the supply-side supply chamber 21 reaches the predetermined height, the flattening roller 12 moves in the Y2 direction to the initial position to supply the powder 20 from the collection-side supply chamber 21 (for example, the supply chamber 21B in FIG. 27A).

In such a case, when the powder supply from the supply chamber 21A to the fabrication chamber 22 ends, the flattening roller 12 directly moves to the initial position of the supply chamber 21B.

Then, as illustrated in FIG. 27B, the supply stage 23 is raised until the powder 20 fully heaves beyond the opening of the supply chamber 21B, and the supply stage 23 of the supply chamber 21A is lowered to the same height as the height of the supply stage 23 of the supply chamber 21B.

As illustrated in FIG. 27C, the flattening roller 12 moves in the Y1 direction from the supply chamber 21B to the supply chamber 21A to transfer the heaved powder 20 to the supply chamber 21A.

In other words, as described above, since the powder 20 stored in the supply chamber 21B being the collection-side supply chamber 21 before the switching is not fully evened, discard recoating is performed by an amount of the powder 20 corresponding to one layer, to fully even the powder 20.

Preferably, the movement speed of the flattening roller 12 in the discard recoating is not greater than the movement speed of the flattening roller 12 in the formation of the powder layer 31. In other words, the powder layer 31 at the uppermost surface of the fabrication chamber 22 is in a state in which the fabrication layer 30 is formed in the powder layer 31. Hence, setting the movement speed of the flattening roller 12 in the discard recoating to be not greater than the movement speed of the flattening roller 12 in the formation of the powder layer 31 can prevent misalignment of the fabrication layer 30 when the powder 20 is transferred, thus maintaining the state of the fabrication object.

The above-described discard recoating allows the powder 20 in the supply chamber 21B to be fully evened, thus reducing variances of the amount of powder supplied in the subsequent formation of the powder layer 31.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. A three-dimensional fabricating apparatus comprising:
   a fabrication chamber in which powder is layered to form a powder layer and bonded together in a desired shape to form a layered fabrication object;
   a supply chamber to store the powder;
   a flattener reciprocally movable above the supply chamber and the fabrication chamber, to transfer the powder and flatten the powder in the fabrication chamber to form the powder layer;
   a detector configured to detect a surface state of the powder in the fabrication chamber; and
   a controller configured to control the flattener to transfer the powder and form the powder layer,
   the controller configured to control the flattener to move in a first direction to transfer and supply the powder from the supply chamber to the fabrication chamber,
   the controller configured to control the flattener to move in a second direction, opposite the first direction, to form the powder layer and transfer an unused portion of the powder from the fabrication chamber to the supply chamber,
   wherein the controller is configured to change a condition of a subsequent flattening operation of the flattener according to a detection result of the surface state by the detector.

2. The three-dimensional fabricating apparatus according to claim 1,
   wherein the flattener is a rotary member configured to rotate when moving in the second direction above the fabrication chamber.

3. The three-dimensional fabricating apparatus according to claim 1, further comprising a vibrator reciprocally movable above the supply chamber and the fabrication chamber, to vibrate the powder when the flattener transfers the powder from the supply chamber to the fabrication chamber.

4. A three-dimensional fabricating apparatus comprising:
   a fabrication chamber in which powder is layered to form a powder layer and bonded together in a desired shape to form a layered fabrication object;
   a supply chamber to store the powder;
   a flattener reciprocally movable above the supply chamber and the fabrication chamber, to transfer the powder and flatten the powder in the fabrication chamber to form the powder layer;
   a detector configured to detect a surface state of the powder in the fabrication chamber; and
   a controller configured to control the flattener to transfer the powder and form the powder layer,
   the controller configured to control the flattener to move in a first direction to transfer and supply the powder from the supply chamber to the fabrication chamber,
   the controller configured to control the flattener to move in a second direction, opposite the first direction, to form the powder layer and transfer an unused portion of the powder from the fabrication chamber to the supply chamber,
   wherein the controller is configured to control the flattener to cause the flattener to form the powder layer again according to a detection result of the surface state by the detector.

5. A three-dimensional fabricating apparatus comprising:
   a fabrication chamber in which powder is layered to form a powder layer and bonded together in a desired shape to form a layered fabrication object;
   two supply chambers disposed at respective sides of the fabrication chamber, to store the powder;
   a flattener reciprocally movable above the two supply chambers and the fabrication chamber, to transfer the powder from the two supply chambers to the fabrication chamber and flatten the powder in the fabrication chamber to form the powder layer,
   the flattener configured to supply the powder from one of the two supply chambers to the fabrication chamber and transfer an unused portion of the powder into the other of the two supply chambers; and
   a stirrer disposed in each supply chamber of the two supply chambers, to stir the unused portion of the powder,
   wherein each of the two supply chambers includes a supply stage to retain the powder and configured to be movable upward and downward, and
   wherein each stirrer includes a rotary plate disposed on the supply stage and configured to rotate during a time period in which the powder layer is formed.

6. The three-dimensional fabricating apparatus according to claim 5,
   wherein each of the two supply chambers is selectable as a supply-side supply chamber to supply the powder to the fabrication chamber, with the other of the two supply chambers being concurrently selected to be a collection-side supply chamber to receive the unused portion of the powder, and
   when the one supply chamber and the other supply chamber are switched to be the collection-side supply chamber and the supply-side supply chamber, respectively, the flattener transfers the powder from the other supply chamber to the one supply chamber without forming the powder layer in the fabrication chamber and evens a surface of the powder in the other supply chamber.

7. The three-dimensional fabricating apparatus according to claim 6,
wherein a movement speed of the flattener to transfer the powder from the other supply chamber to the one supply chamber is lower than a movement speed of the flattener to form the powder layer in the fabrication chamber.

8. The three-dimensional fabricating apparatus according to claim 5, wherein the rotary plate of each stirrer is configured to repeat forward rotation and reverse rotation at regular intervals.

* * * * *